(12) United States Patent
Jahshan

(10) Patent No.: US 9,406,406 B2
(45) Date of Patent: Aug. 2, 2016

(54) CONTROL ROD WITH OUTER HAFNIUM SKIN

(75) Inventor: Salim N. Jahshan, Lynchburg, VA (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 883 days.

(21) Appl. No.: 13/316,826

(22) Filed: Dec. 12, 2011

(65) Prior Publication Data

US 2013/0148773 A1 Jun. 13, 2013

(51) Int. Cl.
| | | |
|---|---|---|
| G21C 7/00 | (2006.01) | |
| G21C 7/10 | (2006.01) | |
| G21C 7/117 | (2006.01) | |
| G21C 1/32 | (2006.01) | |

(52) U.S. Cl.
CPC ........... *G21C 7/10* (2013.01); *G21C 7/117* (2013.01); *G21C 1/322* (2013.01); *Y02E 30/39* (2013.01)

(58) Field of Classification Search
CPC ............. G21C 7/00; G21C 7/06; G21C 7/08; G21C 7/10; G21C 7/117; G21C 7/24; G21C 21/18
USPC .................. 376/207, 219, 224, 327, 333, 339
See application file for complete search history.

(56) References Cited

U.S. PATENT DOCUMENTS

| | | | |
|---|---|---|---|
| 3,519,536 A * | 7/1970 | Rausch ................... | G21C 1/06 376/226 |
| 3,773,617 A * | 11/1973 | Marmonier et al. .......... | 376/243 |
| 4,624,827 A * | 11/1986 | Doshi ...................... | G21C 7/10 376/333 |
| 4,751,041 A | 6/1988 | Ferrari | |
| 4,762,673 A | 8/1988 | Paul et al. | |
| 4,820,478 A | 4/1989 | Freeman | |
| 4,990,303 A | 2/1991 | Bryan et al. | |
| 5,225,151 A | 7/1993 | Bernander et al. | |
| 5,276,718 A * | 1/1994 | Ueda .............................. | 376/220 |
| 5,416,813 A | 5/1995 | Hiraiwa et al. | |
| 5,742,655 A | 4/1998 | Hertz et al. | |
| 5,790,623 A | 8/1998 | Van Swam | |
| 6,130,927 A | 10/2000 | Kang et al. | |
| 6,192,098 B1 | 2/2001 | Van Swam | |
| 6,275,557 B2 | 8/2001 | Nylund et al. | |
| 6,327,322 B1 | 12/2001 | Burton et al. | |
| 6,614,869 B1 | 9/2003 | Thibieroz et al. | |
| 6,636,578 B1 | 10/2003 | Clark | |
| 6,636,580 B2 | 10/2003 | Murakami et al. | |
| 6,721,382 B1 | 4/2004 | Eriksson | |
| 6,819,733 B2 | 11/2004 | Broders et al. | |
| 6,865,242 B2 | 3/2005 | Barbe et al. | |
| 7,085,340 B2 | 8/2006 | Goldenfield et al. | |
| 7,127,024 B2 | 10/2006 | Garzarolli et al. | |
| 7,257,185 B1 | 8/2007 | Yamada et al. | |
| 7,453,972 B2 | 11/2008 | Hellandbrand, Jr. et al. | |
| 7,561,654 B2 | 7/2009 | Makovicka et al. | |
| 7,668,280 B2 | 2/2010 | Hellandbrand, Jr. et al. | |
| 7,668,284 B2 | 2/2010 | Sparrow et al. | |
| 7,815,964 B2 | 10/2010 | Lahoda et al. | |
| 8,537,962 B1 * | 9/2013 | Drudy et al. .................. | 376/327 |
| 2005/0135547 A1 * | 6/2005 | Schulz .......................... | 376/333 |
| 2006/0034412 A1 * | 2/2006 | Hertz ...................... | G21C 7/117 376/224 |
| 2010/0303193 A1 | 12/2010 | Walters | |
| 2011/0002434 A1 | 1/2011 | Lahoda et al. | |

* cited by examiner

*Primary Examiner* — Marshall O'Connor
(74) *Attorney, Agent, or Firm* — Nelson Mullins Riley & Scarborough, LLP

(57) ABSTRACT

A control rod is used to control the reaction of a nuclear reactor. The control rod comprises one or more internal rodlet(s) and a hafnium skin that serves as the outermost layer, rather than a stainless steel cladding. Several variations on rodlets are contemplated. The rodlets are made of hafnium or Ag—In—Cd. The resulting control rod, due to the lack of a stainless steel cladding, has a greater rod reactivity worth, increased weight, and high flexibility.

10 Claims, 23 Drawing Sheets

CONTROL ROD WITH OUTER HAFNIUM SKIN

BACKGROUND

The present disclosure relates to control rods for controlling a nuclear reactor.

A pressurized water reactor (PWR) generally employs a central core containing fissile nuclear fuel assemblies or bundles of nuclear fuel rods that contain fissile material. Thermal energy generated by the fissile reaction heats primary coolant, which is typically light water ($H_2O$) optionally including additives such as boric acid or another soluble neutron poison, although other coolants/moderators such as heavy water ($D_2O$) are also contemplated. The primary coolant passes through a steam generator where it transfers heat to a secondary coolant (usually water), turning the water into steam. The steam can subsequently be used to operate a turbine to generate electrical power or can be used for another purpose. Other types of nuclear reactors operate similarly. For example, in boiling water reactors (BWR) the primary coolant/moderator is not as highly pressurized but is allowed to boil and produce steam directly.

Control rods are inserted into or removed from the core to control the neutron population density of the fuel assemblies. The control rods are fastened at their top ends to a spider assembly. The control rod typically comprises a stainless steel cladding surrounding a neutron-absorbing material, such as an alloy of silver-indium-cadmium (Ag—In—Cd), boron carbide ($B_4C$), or hafnium (Hf) metal. The control rods are slid into and out of guide tubes that are located within the fuel assemblies.

When using hafnium, one consideration that must be taken into account is hydriding. Hydrogen, for example from the reactor coolant, may diffuse through the stainless steel cladding and react with hafnium to form hafnium hydride ($HfH_2$). This is a concern because $HfH_2$ has a greater volume than that of the Hf metal in the original control rod. Swelling of the control rod thus occurs when the Hf metal is converted to $HfH_2$. This may cause problems, depending on the location of and extent of the swelling, that affect the safety of the nuclear reactor. For example, swelling can increase the amount of time needed to fully insert the control rod into the corresponding the guide tube during a rod scram.

Stainless steel itself is not a strong neutron absorber. The volume occupied by the stainless steel thus decreases the potential reactivity worth of the control rod. The rod worth refers to the neutron-absorbing ability of the control rod. A higher rod worth is desirable. In addition, passive safety concerns dictate that the control rod should be as heavy as is reasonably achievable, so that gravity can be used to insert the control rod into its corresponding guide tube when needed. Stainless steel has a density of around 7.8 g/cc, while hafnium itself has a density of 13.3 g/cc.

It is desirable to provide control rods that have a combination of higher rod worth, increased weight, and greater physical and chemical stability (e.g. no hydride formation as in stainless steel clad Hf rods, or no tritium (H3 or $^3H$) that is generated in $B_4C$ containing rods).

BRIEF DESCRIPTION

Disclosed in various embodiments are control rods suitable for use in a nuclear reactor that have a combination of higher rod worth, increased weight, and greater physical stability. The control rod comprises a bare hafnium skin or cladding, within which rodlets, pills, or powder may be arranged. The rodlets and pills do not have any cladding, or put another way the rodlets are bare. As discussed further herein, the rodlets and pills within the bare hafnium skin can be made of hafnium or Ag—In—Cd. Notably, the control rods do not have a stainless steel cladding. The space freed up by the absence of the stainless steel cladding allows for the presence of material having a higher rod worth, i.e. the hafnium tube. The hafnium tube has a hafnium oxide outer layer which is impermeable to hydrogen. The hafnium tube also has adequate strength and structural integrity to be attached to a spider assembly without the need for a cladding. The hafnium in the rod also increases the weight of the control rod, enhancing its rate of insertion under gravity alone.

In some embodiments is disclosed a control rod, comprising a bare hafnium skin having a bullet-nose bottom tip. There may be a hafnium oxide outer layer that is the outermost surface of the control rod. The hafnium skin surrounds a central cavity.

The control rod may further comprise a set of rodlets arranged axially within the central cavity.

In some embodiments, the set of rodlets comprises a plurality of distal rodlets and at least one central rodlet. The plurality of distal rodlets is adjacent the hafnium skin and forms a distal annular layer. Each distal rodlet has an outer surface and an inner surface, the outer and inner surfaces each having a first arc. There is at least one central rodlet at a center of the control rod, each central rodlet having an outer surface, the outer surface having a second arc.

The control rod may have a total of 12 distal rodlets, the first arc being about 30 degrees. Each distal rodlet may have a radial thickness of from about 0.8 millimeter to about 1.2 millimeters.

The control rod may have a total of 4 central rodlets, the second arc being about 90 degrees, with each central rodlet further comprising two radial surfaces extending from opposite ends of the outer surface and forming a vertex. Each central rodlet may have a radial thickness of from about 1.6 millimeter to about 2.4 millimeters.

In addition to the distal rodlets and the central rodlet(s), the set of rodlets may further comprise a plurality of intermediate rodlets forming an intermediate annular layer between the distal annular layer and the at least one central rodlet. Each intermediate rodlet has an outer surface and an inner surface, the outer and inner surfaces each having a third arc.

In some embodiments, the control rod has a total of 8 intermediate rodlets, the third arc being about 45 degrees. Each intermediate rodlet may have a radial thickness of from about 0.8 millimeter to about 1.2 millimeters.

In specific embodiments, the set of rodlets comprises: 12 distal rodlets adjacent the hafnium skin and forming a distal annular layer, each distal rodlet having an outer surface and an inner surface, the outer and inner surfaces each having a first arc of about 30 degrees; 4 central rodlets at a center of the control rod, each central rodlet having an outer surface and two radial surfaces extending from opposite ends of the outer surface and forming a vertex, the outer surface having a second arc of about 90 degrees; and 8 intermediate rodlets forming an intermediate annular layer between the distal annular layer and the central rodlets, each intermediate rodlet having an outer surface and an inner surface, the outer and inner surfaces each having a third arc of about 45 degrees.

In other versions, the rodlets have a cylindrical shape, a triangular shape, or a rectangular shape. In some embodiments that locate rodlets in the central cavity, hafnium powder may also be used to fill any voids between rodlets and the hafnium skin.

In some embodiments, each rodlet has two radial surfaces, an outer surface, and an axial length. Put another way, the rodlets are central rodlets, with the radial surfaces generally having a length substantially equal to the radius of the central cavity. Each rodlet has a plurality of channels along the axial length on the radial surfaces and does not have channels on the outer surface. In some further specific embodiments, the channels on the rodlets are arranged such that channels on one rodlet do not directly face the channels on any adjacent rodlets.

In other embodiments, the bottom ends of the rodlets are spaced apart from an inner surface of the hafnium skin to form a void in the bottom tip of the hafnium skin.

The hafnium skin may have a radial thickness of from about 0.5 millimeter to about 1.0 millimeters. The hafnium skin may also have a hafnium oxide outer layer forming an outermost surface of the control rod In other embodiments, the control rod comprises the hafnium skin, with either hafnium pills or hafnium powder filling the hafnium skin from the first or bottom end to the second or top end.

In still other embodiments, the control rod uses a single solid hafnium rodlet, the rodlet having a bullet-nose bottom tip and an axial length between a top end and a bottom end, to fill the central cavity of the hafnium skin. The single rodlet may comprise a plurality of channels along the axial length to increase the flexibility of the rodlet. The plurality of channels begins above the bullet-nose bottom tip of the rodlet. Each channel extends from an outer surface into the rodlet for a depth of from one-third to one-half of the diameter of the rodlet, the channel forming a chord of the control rodlet. The chords of adjacent channels are rotated with respect to each other. Adjacent channels are also separated axially by a gap of at least 8 centimeters.

Also disclosed in embodiments is a control rod, comprising: a hafnium cladding having a bullet-nose bottom tip and a hafnium oxide outer layer that is the outermost surface of the control rod; a plurality of distal rodlets within and adjacent the hafnium cladding and forming a distal annular layer, each distal rodlet having an outer surface and an inner surface, the outer and inner surfaces each having a first arc; at least one central rodlet within the cladding and at a center of the control rod, each central rodlet having an outer surface and two radial surfaces extending from opposite ends of the outer surface and forming a vertex, the outer surface having a second arc; and a plurality of intermediate rodlets within the cladding and forming an intermediate annular layer between the distal annular layer and the at least one central rodlet, each intermediate rodlet having an outer surface and an inner surface, the outer and inner surfaces each having a third arc.

In other embodiments is disclosed a control system for use in a nuclear reactor, comprising a spider assembly and a plurality of control rods. Each control rod comprises: a hafnium skin with a top end, a bottom end, and a bullet-nose bottom tip, the skin having a hafnium oxide outer layer that is the outermost surface of the control rod, the hafnium skin being connected at the top end to the spider assembly; and a set of rodlets within the bare hafnium skin, each rodlet being connected at an upper end to the spider assembly and extending to the bottom end of the hafnium skin.

The set of rodlets may consist essentially of: a plurality of distal rodlets adjacent the hafnium skin and forming a distal annular layer, each distal rodlet having an outer surface and an inner surface, the outer and inner surfaces each having a first arc; a plurality of central rodlets at a center of the control rod, each central rodlet having an outer surface and two radial surfaces extending from opposite ends of the outer surface and forming a vertex, the outer surface having a second arc; and a plurality of intermediate rodlets forming an intermediate annular layer between the distal annular layer and the at least one central rodlet, each intermediate rodlet having an outer surface and an inner surface, the outer and inner surfaces each having a third arc.

In other embodiments, the set of rodlets consists essentially of: a total of 12 distal rodlets, the first arc being about 30 degrees; a total of 4 central rodlets, the second arc being about 90 degrees; and a total of 8 intermediate rodlets, the third arc being about 45 degrees.

Also disclosed in embodiments is a cylindrical control rod formed of solid hafnium. The solid hafnium control rod has an outermost surface is which is not covered by a cladding. The control rod has a bullet-nose bottom tip and having an axial length between a top end and a bottom end of the control rod. Again, the solid hafnium control rod may comprise a plurality of channels along the axial length to increase the flexibility of the rod. The plurality of channels begins above the bullet-nose bottom tip of the rod. Each channel extends from an outer surface into the rod for a depth of from one-third to one-half of the diameter of the rod, the channel forming a chord of the control rod. The chords of adjacent channels are rotated with respect to each other. Adjacent channels are also separated axially by a gap of at least 8 centimeters.

In some embodiments is disclosed a control rod, comprising a bare hafnium skin having a bullet-nose bottom tip. There may be a hafnium oxide outer layer that is the outermost surface of the control rod. The hafnium skin surrounds a central cavity.

The control rod may further comprise a set of rodlets arranged axially within the central cavity.

In some embodiments, the set of rodlets comprises a plurality of distal rodlets and at least one central rodlet. The plurality of distal rodlets is adjacent the hafnium skin and forms a distal annular layer. Each distal rodlet has an outer surface and an inner surface, the outer and inner surfaces each having a first arc. There is at least one central rodlet at a center of the control rod, each central rodlet having an outer surface, the outer surface having a second arc.

The control rod may have a total of 12 distal rodlets, the first arc being about 30 degrees. Each distal rodlet may have a radial thickness of from about 0.8 millimeter to about 1.2 millimeters.

The control rod may have a total of 4 central rodlets, the second arc being about 90 degrees, with each central rodlet further comprising two radial surfaces extending from opposite ends of the outer surface and forming a vertex. Each central rodlet may have a radial thickness of from about 1.6 millimeter to about 2.4 millimeters.

In addition to the distal rodlets and the central rodlet(s), the set of rodlets may further comprise a plurality of intermediate rodlets forming an intermediate annular layer between the distal annular layer and the at least one central rodlet. Each intermediate rodlet has an outer surface and an inner surface, the outer and inner surfaces each having a third arc.

In some embodiments, the control rod has a total of 8 intermediate rodlets, the third arc being about 45 degrees. Each intermediate rodlet may have a radial thickness of from about 0.8 millimeter to about 1.2 millimeters.

In specific embodiments, the set of rodlets comprises: 12 distal rodlets adjacent the hafnium skin and forming a distal annular layer, each distal rodlet having an outer surface and an inner surface, the outer and inner surfaces each having a first arc of about 30 degrees; 4 central rodlets at a center of the control rod, each central rodlet having an outer surface and two radial surfaces extending from opposite ends of the outer surface and forming a vertex, the outer surface having a second arc of about 90 degrees; and 8 intermediate rodlets forming an intermediate annular layer between the distal annular layer and the central rodlets, each intermediate rodlet having an outer surface and an inner surface, the outer and inner surfaces each having a third arc of about 45 degrees.

In other versions, the rodlets have a cylindrical shape, a triangular shape, or a rectangular shape. In embodiments that use rodlets to fill the central cavity, hafnium powder may also be used to fill any voids between rodlets and the hafnium skin.

The hafnium skin may have a radial thickness of from about 0.5 millimeter to about 1.0 millimeters.

In other embodiments, the control rod comprises the hafnium skin, with either hafnium pills or hafnium powder filling the hafnium skin from the first or bottom end to the second or top end.

In still other embodiments, the control rod uses a single solid hafnium rodlet, the rodlet having a bullet-nose bottom tip and an axial length between a top end and a bottom end, to fill the central cavity of the hafnium skin. The single rodlet may comprise a plurality of channels along the axial length to increase the flexibility of the rodlet. The plurality of channels begins above the bullet-nose bottom tip of the rodlet. Each channel extends from an outer surface into the rodlet for a depth of from one-third to one-half of the diameter of the rodlet, the channel forming a chord of the control rodlet. The chords of adjacent channels are rotated with respect to each other. Adjacent channels are also separated axially by a gap of at least 8 centimeters.

Also disclosed in embodiments is a control rod, comprising: a hafnium cladding having a bullet-nose bottom tip and a hafnium oxide outer layer that is the outermost surface of the control rod; a plurality of distal rodlets within and adjacent the hafnium cladding and forming a distal annular layer, each distal rodlet having an outer surface and an inner surface, the outer and inner surfaces each having a first arc; at least one central rodlet within the cladding and at a center of the control rod, each central rodlet having an outer surface and two radial surfaces extending from opposite ends of the outer surface and forming a vertex, the outer surface having a second arc; and a plurality of intermediate rodlets within the cladding and forming an intermediate annular layer between the distal annular layer and the at least one central rodlet, each intermediate rodlet having an outer surface and an inner surface, the outer and inner surfaces each having a third arc.

In other embodiments is disclosed a control system for use in a nuclear reactor, comprising a spider assembly and a plurality of control rods. Each control rod comprises: a hafnium skin with a top end, a bottom end, and a bullet-nose bottom tip, the skin having a hafnium oxide outer layer that is the outermost surface of the control rod, the hafnium skin being connected at the top end to the spider assembly; and a set of rodlets within the bare hafnium skin, each rodlet being connected at an upper end to the spider assembly and extending to the bottom end of the hafnium skin.

The set of rodlets may consist essentially of: a plurality of distal rodlets adjacent the hafnium skin and forming a distal annular layer, each distal rodlet having an outer surface and an inner surface, the outer and inner surfaces each having a first arc; a plurality of central rodlets at a center of the control rod, each central rodlet having an outer surface and two radial surfaces extending from opposite ends of the outer surface and forming a vertex, the outer surface having a second arc; and a plurality of intermediate rodlets forming an intermediate annular layer between the distal annular layer and the at least one central rodlet, each intermediate rodlet having an outer surface and an inner surface, the outer and inner surfaces each having a third arc.

In other embodiments, the set of rodlets consists essentially of: a total of 12 distal rodlets, the first arc being about 30 degrees; a total of 4 central rodlets, the second arc being about 90 degrees; and a total of 8 intermediate rodlets, the third arc being about 45 degrees.

Also disclosed in embodiments is a cylindrical control rod formed of solid hafnium. The solid hafnium control rod has an outermost surface is which is not covered by a cladding. The control rod has a bullet-nose bottom tip and having an axial length between a top end and a bottom end of the control rod. Again, the solid hafnium control rod may comprise a plurality of channels along the axial length to increase the flexibility of the rod. The plurality of channels begins above the bullet-nose bottom tip of the rod. Each channel extends from an outer surface into the rod for a depth of from one-third to one-half of the diameter of the rod, the channel forming a chord of the control rod. The chords of adjacent channels are rotated with respect to each other. Adjacent channels are also separated axially by a gap of at least 8 centimeters.

Also disclosed in various embodiments is a control rod that comprises at least one Ag—In—Cd rodlet located within a bare hafnium skin or cladding. The at least one Ag—In—Cd rodlet does not have any cladding, or put another way the rodlet is bare. The bare hafnium skin replaces the traditional stainless steel cladding, or in other words a stainless steel cladding is absent. This replacement allows for the presence of material having a higher rod worth, i.e. the hafnium skin. The hafnium skin (having a thickness of about 0.4 mm to about 1.2 mm) also has adequate strength and structural integrity to be attached to a spider assembly without the need for a cladding. The increased amount of hafnium in the rod (due to the hafnium skin) also increases the weight of the control rod, enhancing its rate of insertion under gravity alone.

Disclosed in embodiments is an apparatus comprising a control rod. The control rod comprises a bare hafnium skin and at least one Ag—In—Cd rodlet. The bare hafnium skin has a bullet-nose bottom tip and surrounds the at least one Ag—In—Cd rodlet. The hafnium skin may have a hafnium oxide outer layer forming an outermost surface of the control rod.

The control rod may further include a radial gap between the at least one Ag—In—Cd rodlet and the hafnium skin. An inert gas, such as argon, may fill the radial gap.

In some embodiments, the hafnium skin has a generally uniform radial thickness. The at least one Ag—In—Cd rodlet(s) is/are tapered to conform to the bottom tip of the hafnium skin.

In other embodiments, the bottom tip of the hafnium skin is solid hafnium, i.e. consists of hafnium. A bottom end of the at least one Ag—In—Cd rodlet is a flat surface.

The solid hafnium may extend from a nadir of the hafnium skin for an axial length of from about 10 cm to about 20 cm. Alternatively, the ratio of an axial length of the at least one Ag—In—Cd rodlet to an axial length of the solid hafnium bottom end may be from about 10.5 to about 21.

In some embodiments, the hafnium tube has a radial thickness of from about 0.04 millimeters to about 1.2 millimeters.

The control rod may comprise a single Ag—In—Cd rodlet within the hafnium skin. The single Ag—In—Cd rodlet can sometimes comprise a plurality of channels along an axial length, wherein each channel extends from an outer surface into the rodlet for a depth of from one-third to one-half of the diameter of the rodlet, the channel forming a chord of the rodlet; wherein the chords of adjacent channels are rotated with respect to each other; and wherein adjacent channels are separated axially by a gap of at least 8 centimeters.

In other embodiments, the hafnium skin surrounds a plurality of Ag—In—Cd rodlets. Each rodlet may have a circular cross-section with a diameter of from about 0.1 millimeter to about 2 millimeters.

The control rod may further comprise a threaded screw connector at a top end.

The apparatus may further comprise a nuclear reactor including a reactor core disposed in a pressure vessel. The apparatus is configured to controllably insert the control rod into the reactor core to control reactivity of the reactor core. The nuclear reactor may be a pressurized-water reactor.

Also disclosed is a control system for use in a nuclear reactor. The control rod comprises a coupling element or assembly, and a plurality of control rods. Each control rod includes at least one Ag—In—Cd rodlet and a bare hafnium skin. The bare hafnium skin has a bullet-nose bottom tip and surrounds the at least one Ag—In—Cd rodlet, or put another way is disposed about the Ag—In—Cd rodlet. The hafnium skin is connected at a top end to the coupling element or assembly. The at least one Ag—In—Cd rodlet is connected at a top end to the coupling element or assembly, and extends to a bottom end of the bare hafnium skin.

These and other non-limiting aspects of the present disclosure are more particularly described below.

BRIEF DESCRIPTION OF THE DRAWINGS

The following is a brief description of the drawings, which are presented for the purpose of illustrating the exemplary embodiments disclosed herein and not for the purpose of limiting the same.

DETAILED DESCRIPTION

Figure 1:
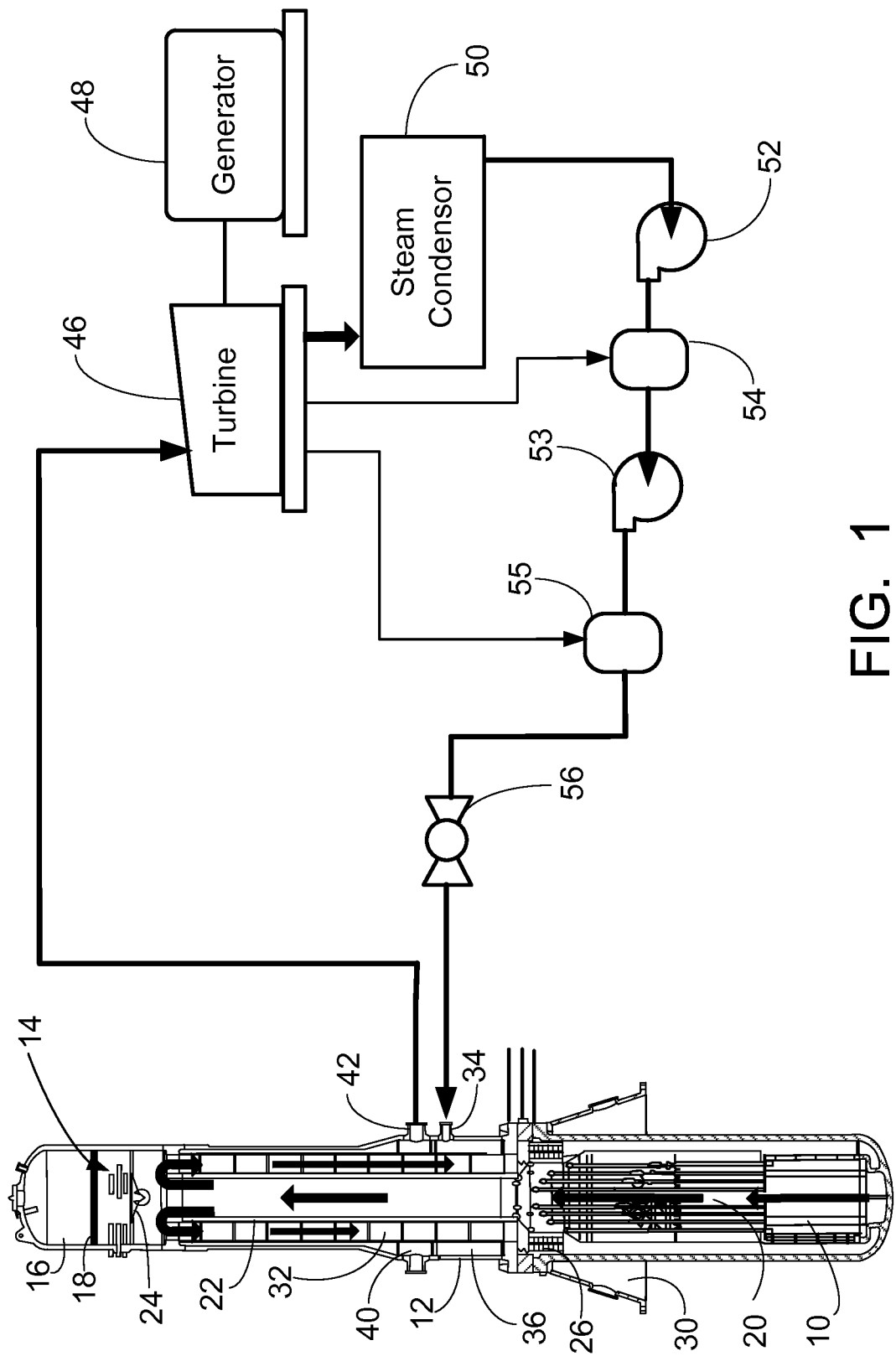
FIG. 1 is a perspective sectional view of an illustrative pressurized water nuclear reactor (PWR) including an integral steam generator.

A more complete understanding of the components, processes, and apparatuses disclosed herein can be obtained by reference to the accompanying figures. These figures are merely schematic representations based on convenience and the ease of demonstrating the present development and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The term "comprising" is used herein as requiring the presence of the named component and allowing the presence of other components (except as specifically excluded). The term "comprising" should be construed to include the term "consisting of" (which allows the presence of only the named component, along with any impurities that might result from the manufacture of the named component) and "consisting essentially of" (which allows the presence of the named component, impurities, and other materials that do not materially affect the basic characteristics of the component).

The terms "single" or "one" are used in some places to denote that there is only one of the referenced component. In particular, when either of these terms is used in conjunction with the term "comprising", the overall phrase should be construed to allow the presence of only one of the named component, while allowing the presence of other components. The terms "single" or "one" are intended to distinguish from a "plurality", which allows for two or more of the reference component.

In some embodiments disclosed herein, a control rod comprises a bare hafnium skin. In other embodiments disclosed herein, rodlets are arranged axially within the skin. In particular embodiments disclosed herein, a control rod comprises at least one Ag—In—Cd rodlet and a hafnium skin surrounding the at least one Ag—In—Cd rodlet. The control rod may serve as part of a control system when connected to a suitable control rod drive mechanism (CRDM).

With reference to FIG. 1, a perspective sectional view of an illustrative pressurized water nuclear reactor (PWR) including an integral steam generator is shown. A nuclear reactor core 10 is disposed inside a generally cylindrical pressure vessel 12, which contains primary coolant 14, which in the illustrative case of a light water reactor is water ($H_2O$) optionally containing additives such as soluble boric acid serving as a soluble neutron poison. The PWR includes a steam bubble 16 in the upper portion of the volume, with a water level 18 delineating between the steam bubble 16 and the liquid primary coolant 14. Pressure is adjusted via the steam bubble 16, using electric heaters or the like or an external pressurizer (components not shown).

Reactor control is provided by a control rod system 20 including a drive mechanism (CRDM) that is configured to controllably insert and withdraw neutron-absorbing control rods into and out of the nuclear reactor core 10. In some embodiments disclosed herein, the control rods comprise hafnium (Hf). The CRDM may be divided into multiple units, each controlling one or more control rods, in order to provide redundancy or other benefits. A spider or other coupling element or coupling assembly may be included in order to connect a plurality of control rods with a single CRDM unit which moves the plurality of control rods upward or downward together as a unit. The illustrative control rod system 20 includes internal CRDM units in which the drive motors and other components are disposed inside the pressure vessel 12 and submerged in the primary coolant 14, with only electrical power and control wiring extending outside the pressure vessel 12. Alternatively, external CRDM units may be employed.

The pressure vessel 12 is configured to define a desired circulation of the primary coolant 14. In the illustrative example, the circulation is defined by a hollow cylindrical central riser 22 disposed coaxially in the illustrative cylindrical pressure vessel 12. Primary coolant 14 heated by the reactor core 10 flows upward through fluid conduits passing through the control rod system 20 and upward through the hollow central riser 22, discharges at the top of the hollow central riser 22 and is diverted downward by a diverter 24, flows downward through an annulus defined between the cylindrical central riser 22 and the walls of the cylindrical pressure vessel 12, and is then diverted upward at the bottom of the pressure vessel 12 to return to the reactor core 10. Optional primary coolant pumps 26 may be provided to drive the circulation of the primary coolant 14, or to assist natural circulation of the primary coolant 14. The illustrative coolant pumps 26 are internal pumps which are wholly inside the pressure vessel 12 and submerged in the primary coolant 14, with only electrical power and optional control wiring extending outside the pressure vessel 12. Alternatively, natural circulation may be relied upon for circulating the primary coolant.

The pressure vessel 12 is suitably positioned substantially vertically. An optional skirt 30 may be provided to support the pressure vessel 12, or to bias against the pressure vessel 12 tipping over. The illustrative skirt 30 is positioned such that the lower portion of the pressure vessel 12 containing the reactor core 10 is located in a recess below ground, which facilitates flooding for safety in the event of a loss of coolant accident (LOCA) or other accident. In the operative state of the nuclear reactor, the control rod system 20 withdraws (or at least partially withdraws) the control rods from the nuclear reactor core 10 to initiate a nuclear reaction in the core 10. In a thermal nuclear reactor, the primary coolant 14 serves as a neutron moderator to thermalize higher energy neutrons so as to maintain or enhance the nuclear reaction. In the operating state of a PWR, the primary coolant 14 is superheated. In the case of a boiling water reactor (BWR) (not illustrated), the primary coolant is not superheated but is boiling.

To provide steam generation, the primary coolant 14 heated by the operating reactor core 10 is brought into thermal communication with a secondary coolant (typically light water, $H_2O$ optionally containing various additives, solutes, or so forth) flowing in a steam generator. In some embodiments (not illustrated), the steam generator is external to the pressure vessel and connected therewith by a relatively large-diameter vessel penetration carrying the primary coolant. In the illustrative embodiment of FIG. 1, however, an integral steam generator 32 is located inside the same pressure vessel 12 containing the reactor core 10. The illustrative integral steam generator 32 is located in the annulus surrounding the central riser 22, that is, in the annular space between the exterior of the central riser 22 and the inside walls of the pressure vessel 12. Secondary coolant in the form of feedwater is input via a feedwater inlet 34 into an annular feedwater inlet plenum 36 (or, alternatively, into a tubesheet) where it feeds into a lower end of the steam generator 32. The secondary coolant rises generally upward through the steam generator 32 in secondary coolant flow paths or volume that are in thermal communication with (but in fluid isolation from) proximate primary coolant flow paths or volume through which primary coolant flows generally downward. (Note that FIG. 1 does not show details of the steam generator). The steam generator configuration can take various forms. In some embodiments, the steam generator comprises tubes carrying primary coolant generally downward, while the secondary coolant flows generally upward in a volume outside of the tubes. Alternatively, the secondary coolant may flow generally upward through the steam generator tubes while the primary coolant flows generally downward outside of the tubes. The tubes may comprise straight vertical tubes, slanted vertical tubes, helical tubes wrapping around the central riser 22, or so forth. However arranged, heat transfer takes place from the superheated primary coolant to the secondary coolant, which converts the secondary coolant from the liquid phase to the steam phase. In some embodiments the steam generator may include an integral economizer in a lower portion of the steam generator. In some embodiments, the steam generator may comprise a plurality of constituent steam generators to provide redundancy. The resulting steam enters an annular steam plenum 40 (or, alternatively, into a tubesheet) and from there passes out one or more steam outlets 42.

The steam (whether generated by an integral steam generator such as the illustrative integral steam generator 32, or by an external steam generator unit) can be used for substantially any purpose suitably accomplished using steam power. In the illustrative electrical plant of FIG. 1, the steam drives a turbine 46 which in turn drives an electrical power generator 48 to produce electrical power. A steam condenser 50 downstream of the turbine 46 condenses the steam back into a liquid phase so as to recreate secondary coolant comprising feedwater. One or more pumps 52, 53 and one or more feedwater heaters 54, 55 or other feedwater conditioning components (e.g., filters, components for adding additives, or so forth) generate feedwater at a desired pressure and temperature for input to the feedwater inlet 34. A feedwater valve 56 suitably controls the inlet feedwater flow rate.

The PWR described with reference to FIG. 1 is merely an illustrative example. The control rods disclosed herein are suitably used in the illustrative PWR reactor, or in a PWR reactor coupled with one or more external steam generators, or with a BWR, or so forth. The present disclosure contemplates several different aspects in the construction of the control rod. These different aspects are separately described, but can be combined in any fashion.

Figure 2:
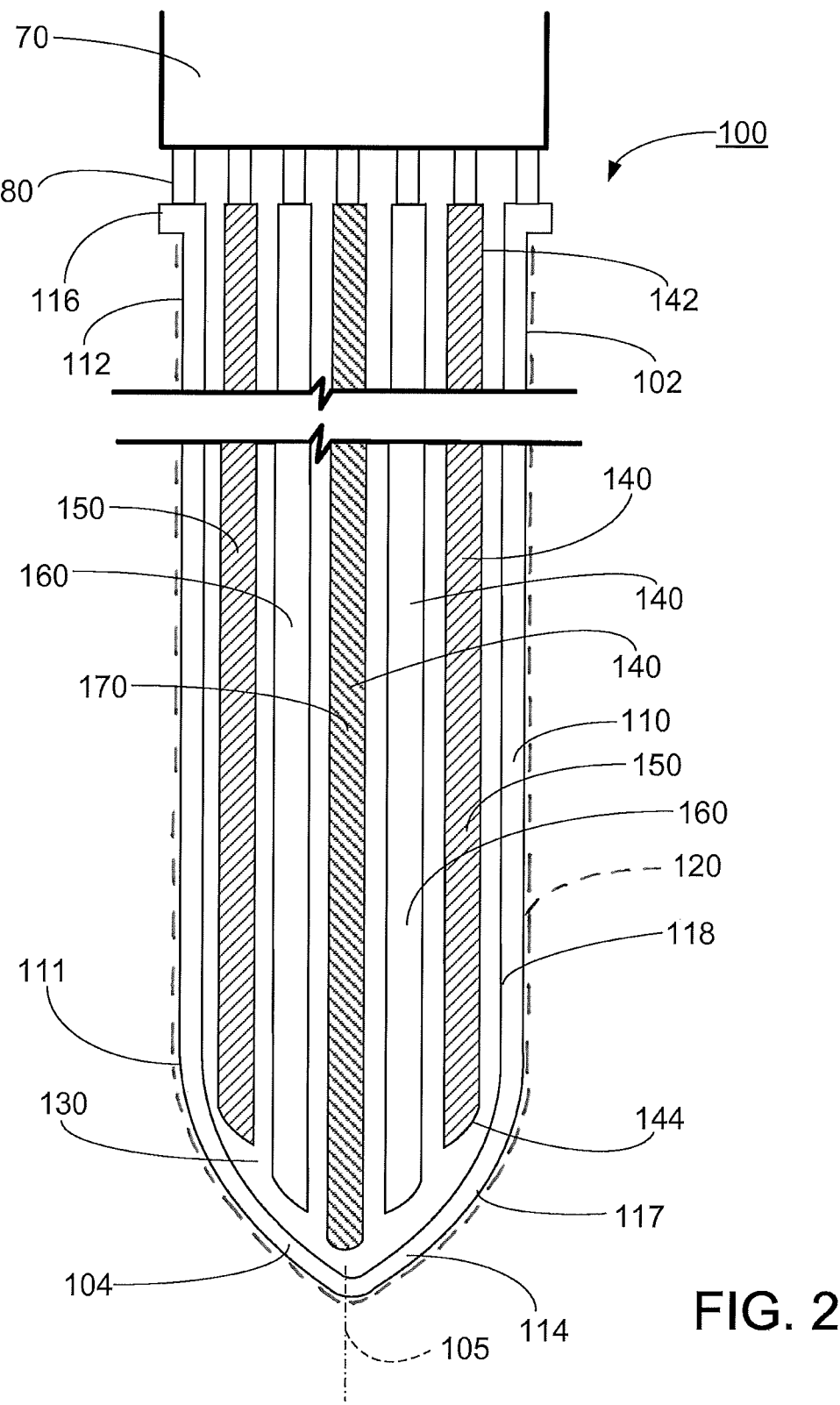
FIG. 2 is a side cross-sectional view of a first exemplary control rod.
Figure 3:
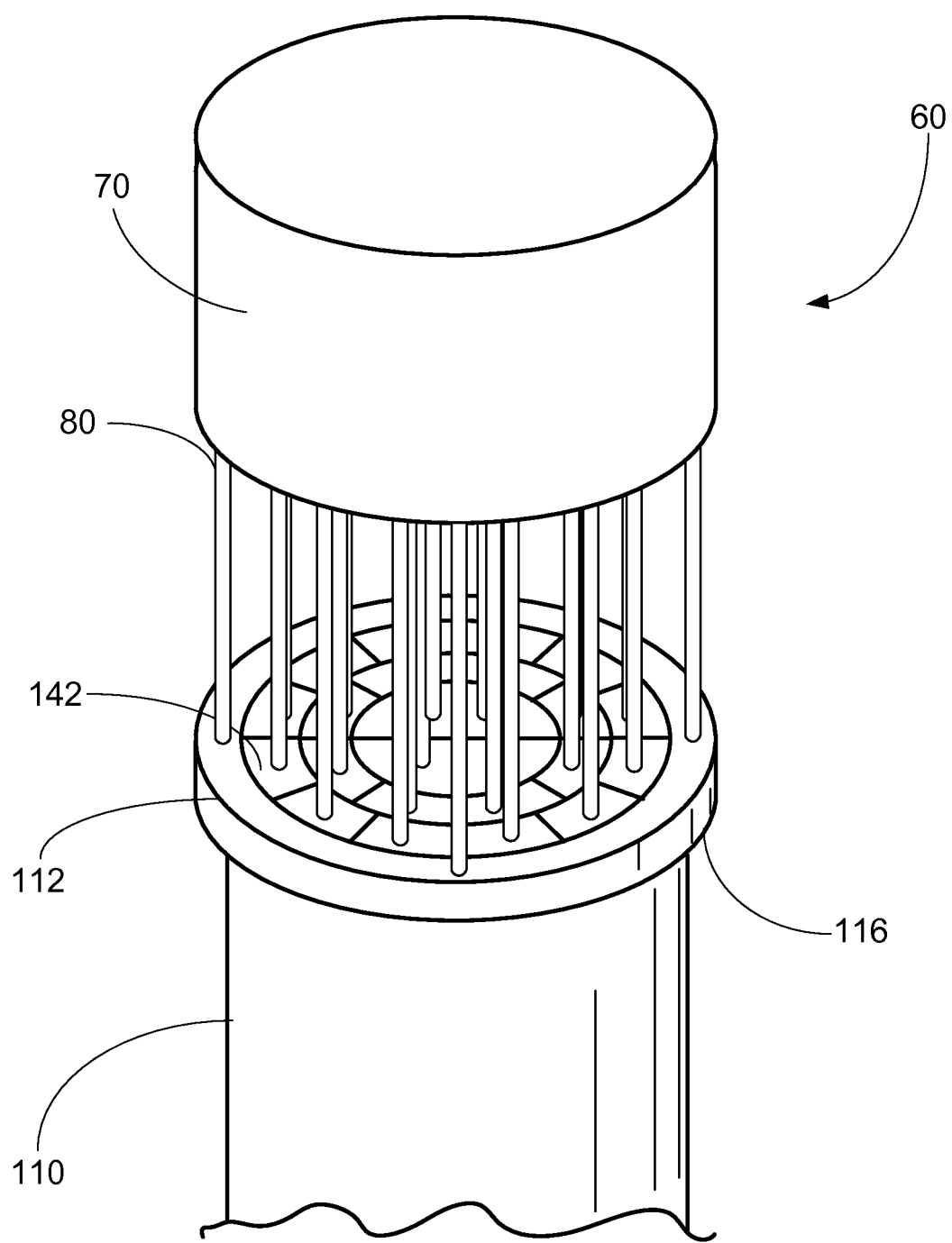
FIG. 3 is a perspective view showing the first exemplary control rod of FIG. 2 in combination with a spider assembly.
Figure 4:
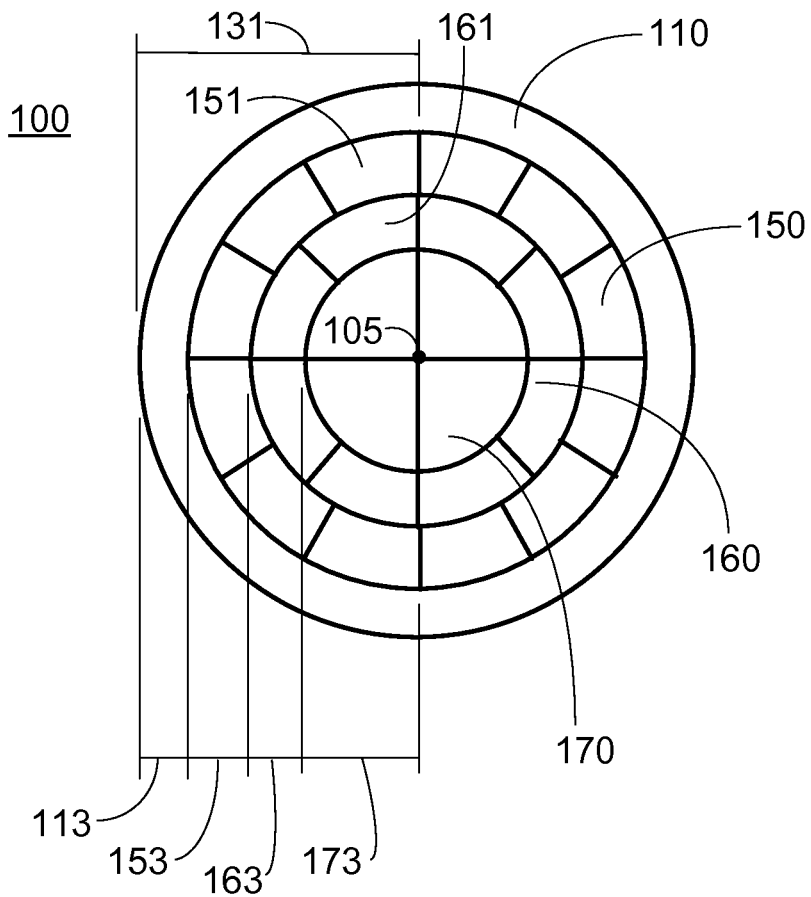
FIG. 4 is a top cross-sectional view of the first exemplary control rod of FIG. 2.

An exemplary embodiment of the control rod of the present disclosure is shown in FIGS. 2-4. FIG. 2 is a side cross-sectional view of the control rod in combination with a spider assembly. FIG. 3 is a perspective view of the control rod and the spider assembly. FIG. 4 is a top cross-sectional view of the control rod.

Generally speaking, the spider assembly 60 comprises a central casing 70 with a plurality of arms 80 extending from the central casing, either radially or longitudinally as shown here. Other coupling elements or assemblies are also contemplated. One or more arms 80 of the spider assembly can interconnect to the top end 112 of the hafnium skin 110. A lip 116 may be present at the top end 112 of the hafnium skin to facilitate this connection. Similarly, in some embodiments, an arm 80 of the spider assembly can interconnect to the top end 142 a rodlet 140 wherein a water tight seal (not shown) prevents coolant from entering the structure of the rod. The hafnium skin and the rodlets all hang under their own weight from the spider assembly. The rodlets do not rest on the bullet-nose bottom tip 114 of the hafnium skin, nor do they depend on the hafnium skin or adjacent rodlets for support.

The control rod 100 has a top end 102 and a bottom end 104. The control rod comprises a bare hafnium skin 110 made of elemental hafnium. The hafnium skin may also be described as having a tubular shape. This hafnium skin can also be considered a hafnium cladding. No stainless steel cladding, or cladding of any other material, is present around the hafnium skin. The hafnium skin 110 also has a top end 112 and a bottom end 114. The bottom end 114 of the hafnium skin is located at the bottom end 104 of the control rod. The bottom end of the hafnium skin has a tapered or bullet-nose bottom tip 117. Transition point 111 denotes the point where the hafnium skin begins to taper to form the bottom tip 117. The hafnium skin 110 surrounds a central cavity 130, which has a radius 131. The inner surface of the hafnium skin is labeled with reference numeral 118. The hafnium skin generally maintains a constant radial thickness 113 along the length of the control rod down to the transition point 111.

A thin hafnium oxide outer layer 120 may be present on the hafnium skin. The hafnium oxide outer layer is the outermost surface of the control rod. In this regard, the temperature at which Hf metal begins to hydride in water is over 700° C., which is well above the peak temperature of any PWR, or any light water reactor (LWR) in general. However, $HfH_2$ is sometimes observed inside stainless steel clad hafnium rods. Thus, it is expected that bare Hf metal (i.e. without a cladding surrounding the rod) in a PWR (or any water-cooled/moderated reactor) will not hydride, because the Hf metal of the hafnium skin is not clad in stainless steel where the hafnium may experience long-term exposure to water that may be heated or vaporized to temperatures at which the water could interact excessively with the Hf metal. According to the ASM Handbook, Volume 13B (published 2005, ISBN 978-0871707079), hafnium is not expected to interact with oxygen until a temperature of about 400° C., when a protective layer of hafnium oxide ($HfO_2$) is formed. This hafnium oxide outer layer is expected to impede hydriding of the hafnium skin as well. 400° C. is also above the peak temperature of any PWR or LWR.

One or more rodlets 140 are arranged axially within the central cavity, i.e. parallel to central axis 105. Put another way, the bare hafnium skin surrounds the rodlet(s). It should be noted that these rodlets are also bare, or in other words there is no cladding surrounding each rodlet either. Each rodlet has a top end 142 which can be interconnected to a spider assembly. Each rodlet also has a bottom end 144 which is proximate to the bottom tip 114 of the hafnium skin.

Each hafnium rodlet 140 will become covered with a thin layer of hafnium oxide when exposed to air. This oxide layer will hinder any bonding between the hafnium skin 110 and the rodlet 140, so the rodlet(s) and the skin can slide against each other. If desired, a coating may also be placed on the surfaces of each rodlet to act as a lubricant.

Different arrangements of rodlet(s) are contemplated, as will be discussed further herein. These different arrangements or embodiments can achieve a flexible control rod, with the shapes of the rodlet(s) determining the amount of flexibility in the control rod and the relative effective density of the control rod. Each rodlet 140 can be made of elemental hafnium or an Ag—In—Cd alloy. In some embodiments, different forms of hafnium are used. Ag—In—Cd has good relative cost and reduced machining and manufacturing costs.

As seen in FIG. 4, in one arrangement, the set of rodlets comprises a plurality of distal rodlets 150, a plurality of intermediate rodlets 160, and at least one central rodlet 170. As shown here, there is a plurality of central rodlets 170. The distal rodlets 150 are located adjacent to the hafnium skin 110 and can be considered to form a distal annular layer 151. The central rodlet(s) 170 is located at the center of the control rod, i.e. adjacent to the central axis 105. The intermediate rodlets 160 are located between the distal annular layer 151 and the central rodlet(s) 170, and can be considered to form an intermediate annular layer 161.

Figure 5:
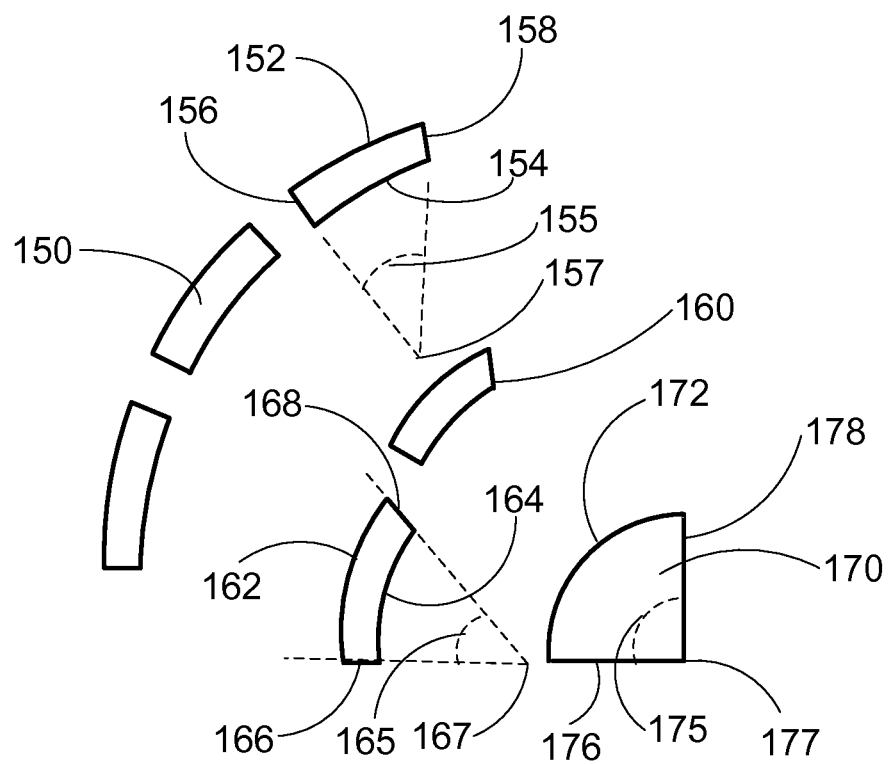
FIG. 5 is an exploded view of the rodlets in the control rod of FIG. 2.

FIG. 5 is an exploded view of the rodlets of FIG. 4. Each distal rodlet 150 has an outer surface 152, an inner surface 154, and two radial surfaces 156, 158. The outer and inner surfaces 152, 154 each have a first arc 155, the arc being measured at the vertex 157 where the radial surfaces join. The central rodlet 170 has an outer surface 172. The outer surface 172 has a second arc 175. As shown in FIG. 5, the central rodlet 170 also has two radial surfaces 176, 178 that extend from opposite ends of the outer surface to form a vertex 177. Each intermediate rodlet 160 has an outer surface 162, an inner surface 164, and two radial surfaces 166, 168. The outer and inner surfaces 162, 164 each have a third arc 165, the arc being measured at the vertex 167 where the radial surfaces join. The outer and inner surfaces of each rodlet are relative to the central axis 105.

In FIG. 4, there are a total of 12 distal rodlets 150, with the first arc being about 30 degrees. There are a total of 4 central rodlets 170, with the second arc being about 90 degrees. There are a total of 8 intermediate rodlets 160, with the third arc being about 45 degrees. It is contemplated that all three types of rodlets 140 will share the same vertex from which their arc is measured. That vertex is generally located along the central axis 105.

The control rod has a total diameter of 9.779 millimeters, which provides some tolerance for variances in the diameter of the guide tube into which the control rod is inserted (~10 mm). The hafnium skin 110 itself may have a radial thickness 113 of from about 0.5 millimeters to about 1.0 millimeters. Each distal rodlet 150 may have a radial thickness 153 of from about 0.8 millimeter to about 1.2 millimeters. Each intermediate rodlet 160 may have a radial thickness 163 of from about 0.8 millimeter to about 1.2 millimeters. Each central rodlet 170 may have a radial thickness 173 of from about 1.6 millimeters to about 4.9 millimeters, depending on the presence or absence of the distal and/or intermediate rodlets. In particular embodiments, the radial thickness of each central rodlet is from about 1.6 millimeters to about 2.4 millimeters, or from about 3.6 millimeters to about 4.9 millimeters.

In FIG. 4, two annular layers 151, 161 surrounded a central rodlet 170. Generally speaking, it is contemplated that the rodlets arranged axially within the central cavity may be arranged in any number of concentric annular layers, like an onion skin, inside the bare hafnium skin 110, within practical reasons (e.g. the ability to attach all of the rodlets to a control rod system). Each annular layer may be made of any number of rodlets, the number in each annular layer in FIG. 4 being merely illustrative. In particular, it is contemplated that in some embodiments, there are four rodlets in each annular layer, with each rodlet in an annular layer having an arc of 90 degrees. It is also contemplated that there may be three annular layers.

Figure 6:
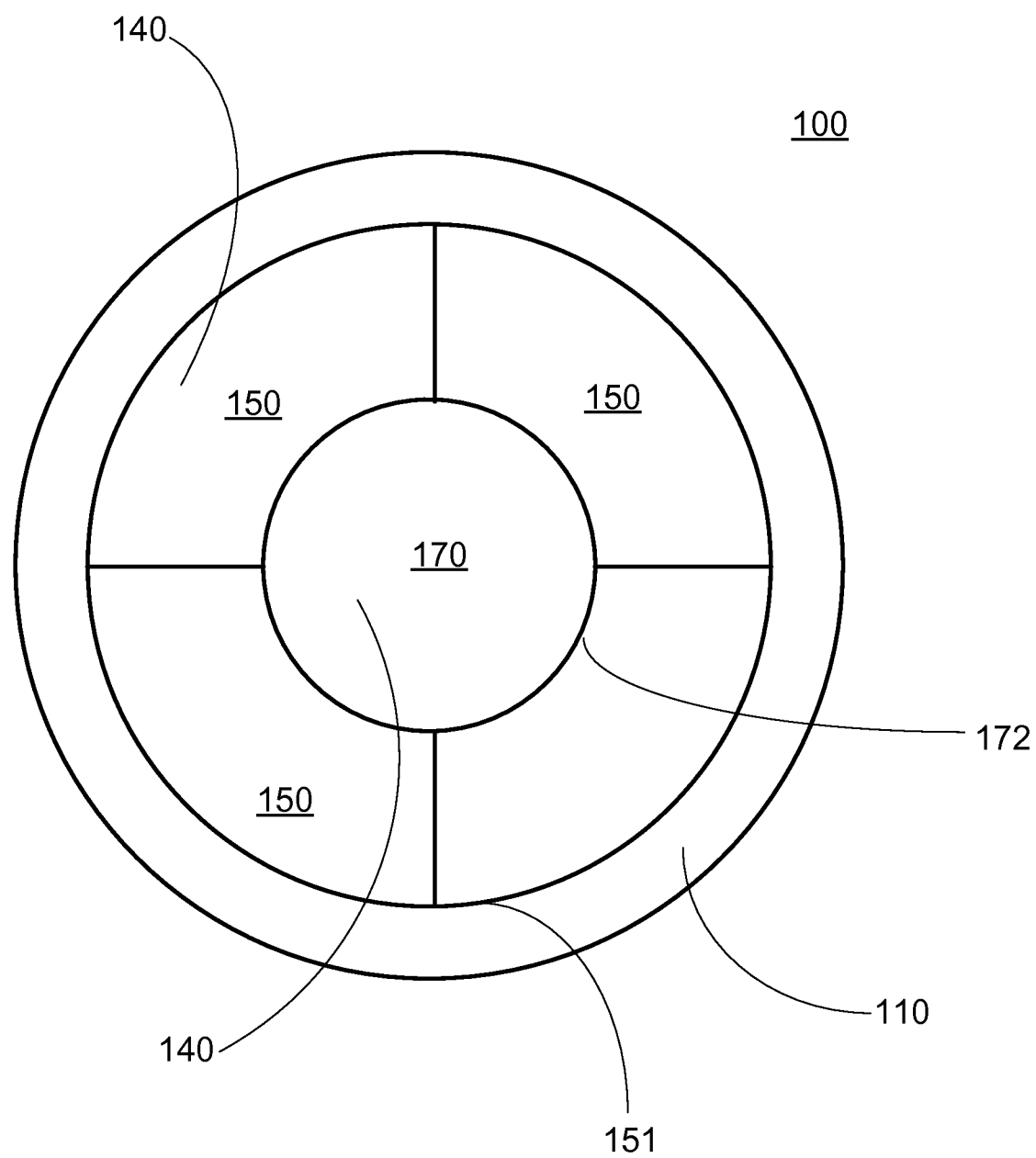
FIG. 6 is a top cross-sectional view of a second exemplary control rod, with a different set of rodlets.

FIG. 6 illustrates one such variation. Here, a set of rodlets 140 is surrounded by the hafnium skin 110. The set of rodlets here includes only a plurality of distal rodlets 150 and one central rodlet 170. The central rodlet 170 has an outer surface 172 that covers an arc of 360 degrees. There are four distal rodlets 150, each having an arc of 90 degrees. The four distal rodlets 150 are adjacent to the hafnium skin 110 and form an annular layer 151 around the central rodlet 170. No intermediate rodlets are present here.

Figure 7:
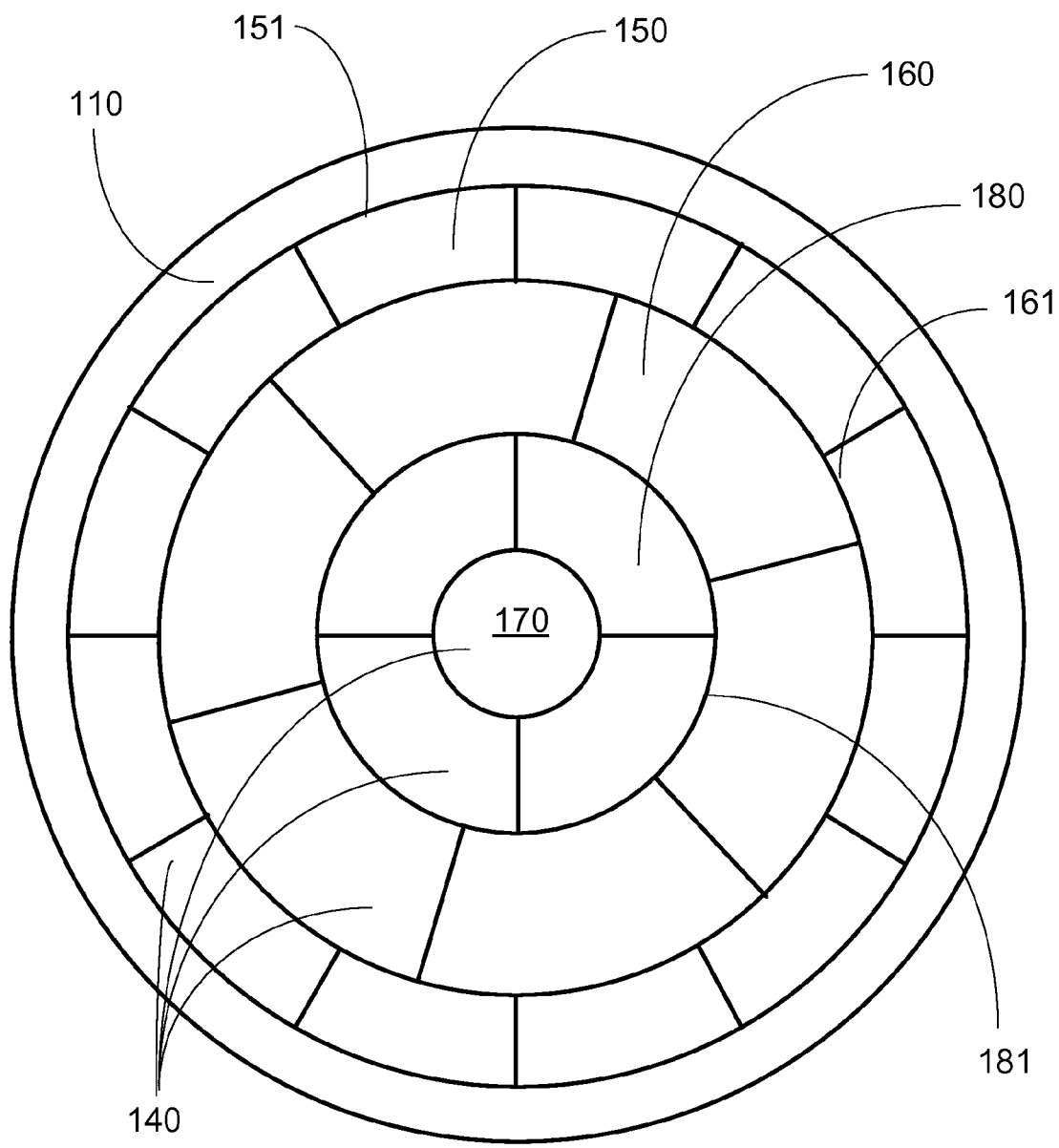
FIG. 7 is a top cross-sectional view of a third exemplary control rod, with a different set of rodlets.

FIG. 7 illustrates another such variation. Here, a set of rodlets 140 is surrounded by the hafnium skin 110. The set of rodlets includes a central rodlet 170, a plurality of distal rodlets 150, and two sets of intermediate rodlets 160, 180. The distal rodlets form a distal annular layer, the first set of intermediate rodlets 160 forms an outer intermediate annular layer 161, and the second set of intermediate rodlets 180 forms an inner intermediate annular layer 181.

Figure 8:
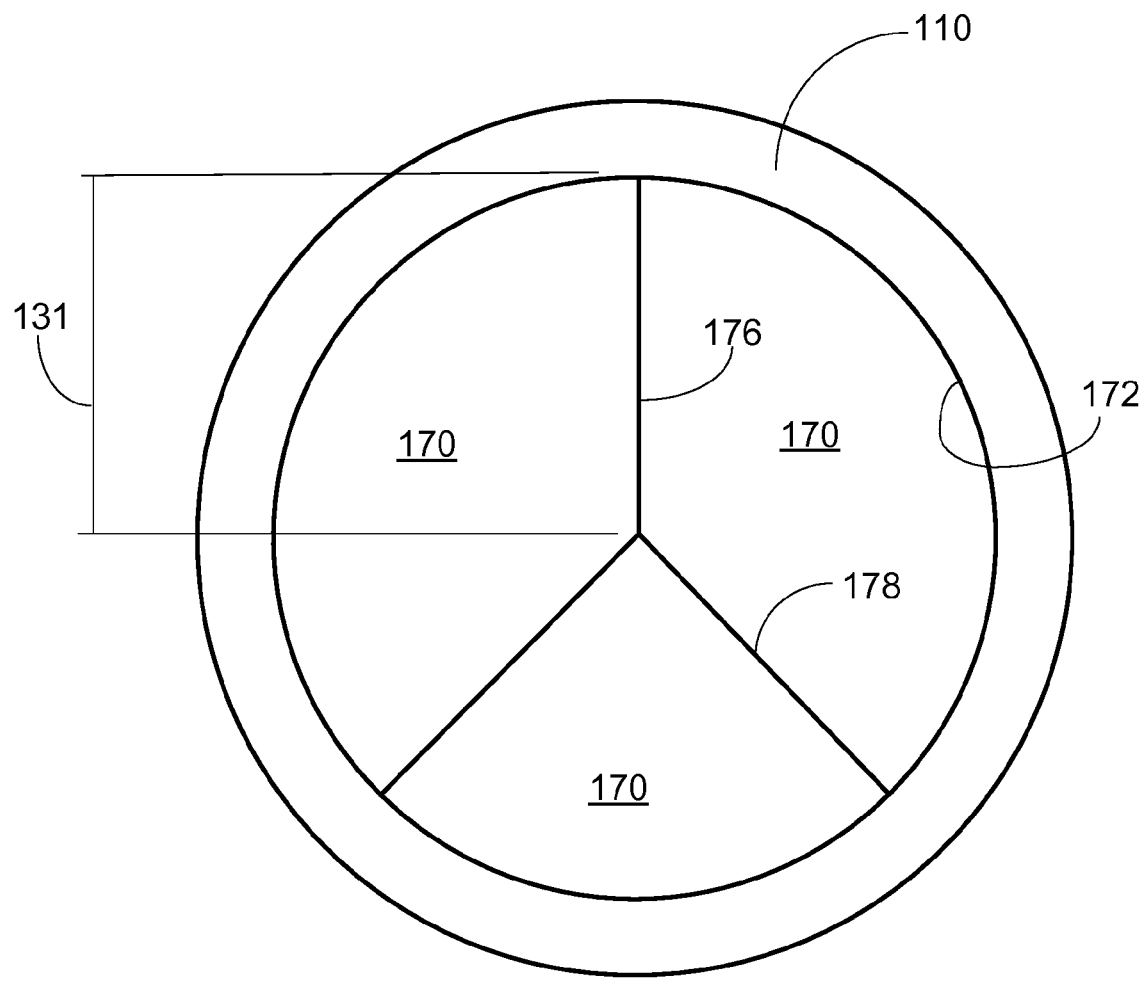
FIG. 8 is a top cross-sectional view of a fourth exemplary control rod, having only a set of central rodlets.

FIG. 8 illustrates another contemplated variation. Here, the hafnium skin 110 surrounds a plurality of central rodlets 170. Here, there are three central rodlets 170. The outer surface 172 of each central rodlet 170 covers an arc of 120 degrees. It should be noted that in this embodiment, the length of each radial surface 176, 178 is about equal to the radius 131 of the central cavity 130.

The control rod itself has a diameter of 9.779 millimeters, and a total length of about 210 centimeters (from the top end of the rod to the end of the bullet-nose bottom tip). One advantage of the structure of the present control rod is that if there is some inadvertent curvature in the control rod or its guide tube, the control rod is physically flexible and can snake past the curvature.

Referring back to FIG. 2, each rodlet 140 extends from the top end 102 of the control rod to the bottom end 104 of the control rod. The rodlets 140 vary in length and shape at their bottom ends 144 to conform to the bullet-nose shape of the hafnium skin 110. Thus, for example, the central rodlets 150 are longer than the intermediate rodlets 160 or the distal rodlets 170. The bottom ends 144 of the rodlets could also be described as having a partial bullet-nose shape, or as being tapered.

The rodlets 140 are shaped to minimize any loss of theoretical density, or put another way to maximize the percentage of theoretical density, or to obtain a maximal packing density. Constructing the control rod in this manner preserves most of the absorption strength compared to a single stiff solid bare hafnium rod with a diameter of 9.779 millimeters, but provides flexibility as described above.

Figure 9:
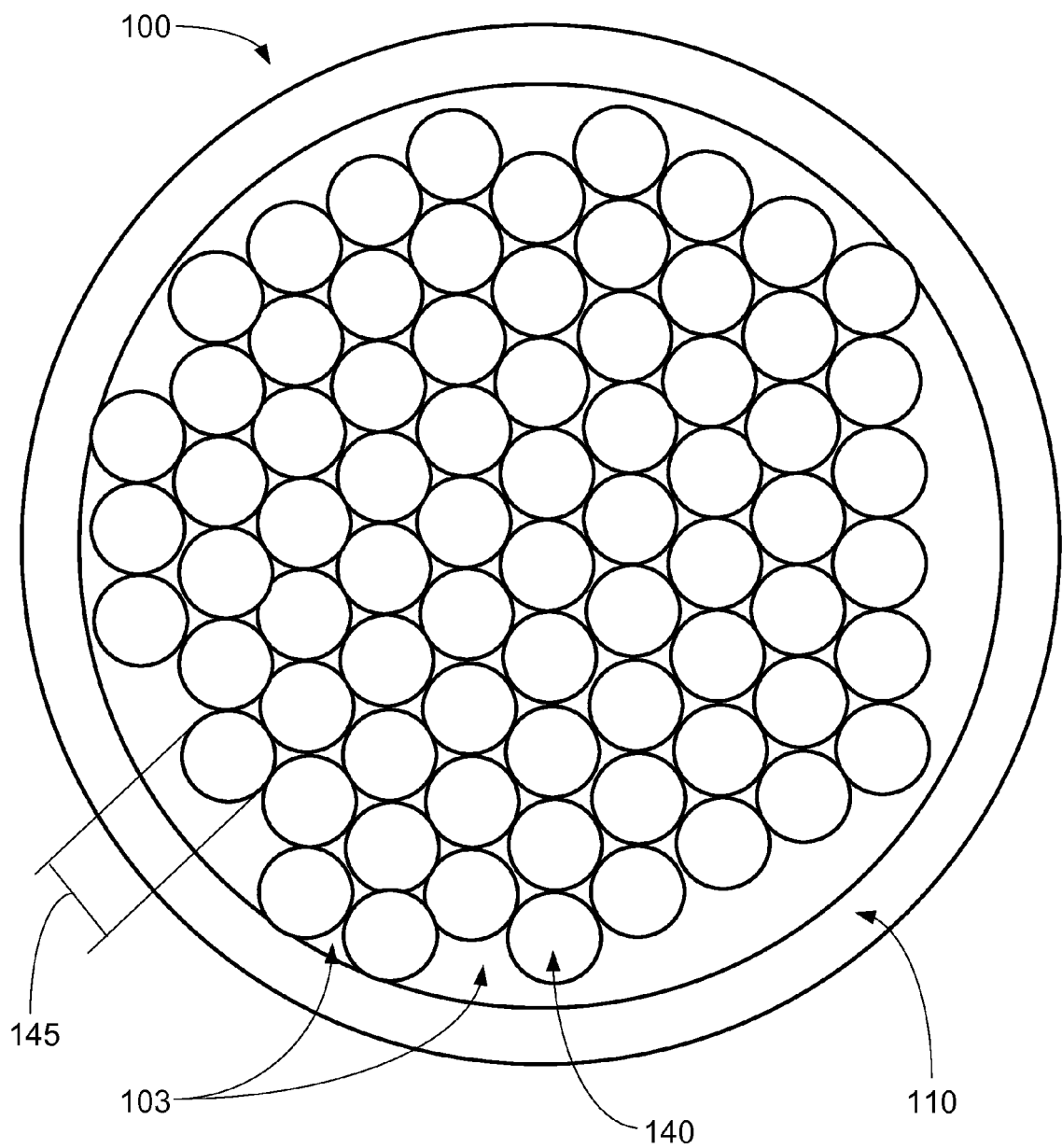
FIG. 9 is a top cross-sectional view of a fifth exemplary control rod, where the rodlets have a circular cross-section.

Another embodiment is illustrated in the top cross-sectional view of FIG. 9. A set of rodlets 140 is shown within the hafnium skin 110. Here, the rodlets 140 have a circular cross-section. As shown here, all of the rodlets 140 have the same diameter 145. However, it is also contemplated that the set of rodlets may be made up of groups of rodlets, each group having a different diameter as needed to maximize the percentage of theoretical density. In embodiments, each rodlet has a diameter of from about 0.1 millimeter to about 2 millimeters. Generally, a smaller diameter will result in an increase in the percentage of theoretical density, but will also increase the difficulty of connecting each rodlet to the spider assembly. The length of the rodlets and shape of the rodlets at their bottom end can vary to conform to the bullet-nose shape of the hafnium skin 110; this aspect is not seen here. For ease of assembly, the cylindrical rodlets are generally arranged in a hexagonal lattice (i.e. so that a rodlet is tangent to its six immediate neighbors).

Mathematically, the central cavity of the hafnium skin can be most efficiently filled by either a triangular lattice or a square lattice. In other words, the rodlets have either a triangular or a square cross-section when viewed from the top. If desired, the inner surface 118 of the hafnium skin may be crafted or shaped to have a variable thickness to accommodate the shapes of the rodlets.

Figure 10:
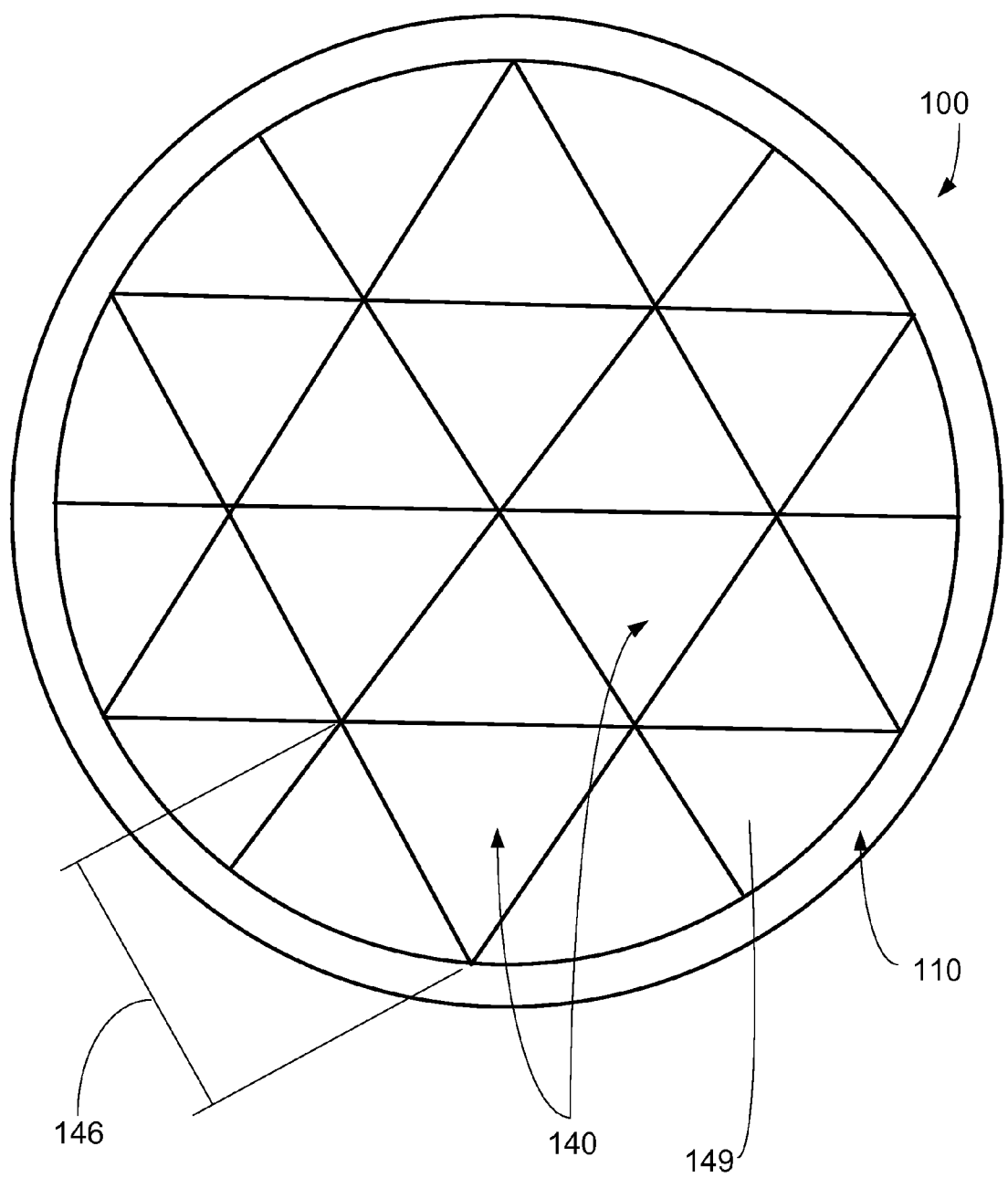
FIG. 10 is a top cross-sectional view of a sixth exemplary control rod, where the rodlets have a triangular cross-section.

In the embodiment illustrated in the top cross-sectional view of FIG. 10, the rodlets have a triangular cross-section. The term "triangular" is used here to indicate that the rodlets have three sides. In some particular embodiments, the rodlets have three straight sides. As shown here, all of the rodlets have the same side length 146. The side length may be from less than 1 millimeter to about 2 millimeters, as desired. Again, it is also contemplated that the rodlets could have varying side lengths as needed to maximize the percentage of theoretical density. Alternatively, some of the rodlets could have a curved third side, rather than a straight side, as indicated by reference numeral 149. The length of the rodlets and shape of the rodlets at their bottom end can vary to conform to the bullet-nose shape of the hafnium skin 110; this aspect is not seen here.

Figure 11:
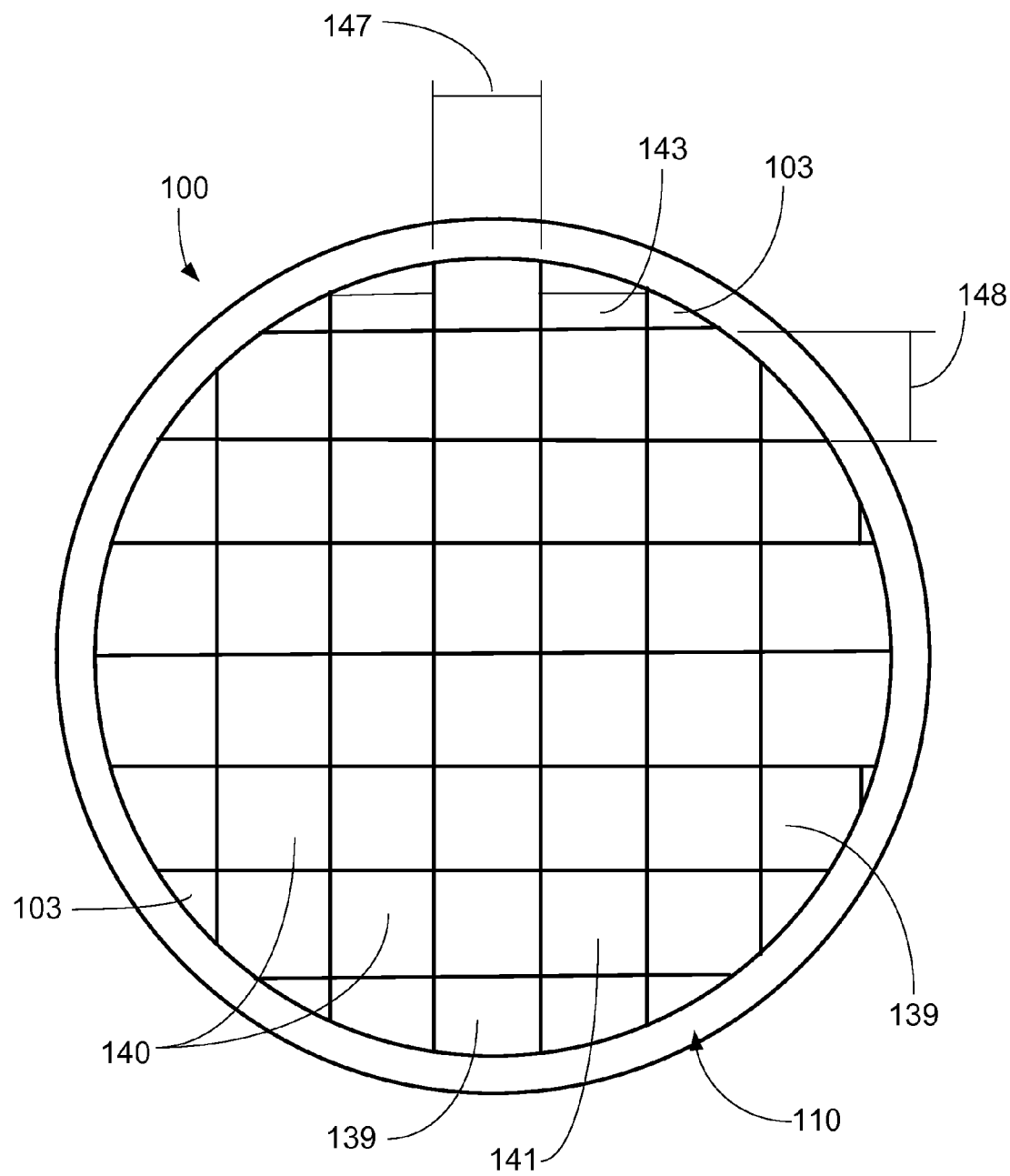
FIG. 11 is a top cross-sectional view of a seventh exemplary control rod, where the rodlets have a rectangular cross-section.

In the embodiment illustrated in the top cross-sectional view of FIG. 11, the rodlets have rectangular cross-sections. The term "rectangular" is used here to indicate that the rodlets have four sides and four right angles. In some particular embodiments, the rodlets have three straight sides. The side lengths 147, 148 may be from less than 1 millimeter to about 2 millimeters, as desired. It is contemplated that the set of rodlets may be made up of several groups of rectangles, each group having different side lengths as needed to maximize the percentage of theoretical density. For example, shown here are two groups of rectangles 141, 143. The length of the rodlets and shape of the rodlets at their bottom end can vary to conform to the bullet-nose shape of the hafnium skin 110; this aspect is not seen here. In particular embodiments, at least one group of rodlets have square cross-sections (a square being a specific case of rectangle). Alternatively, some of the rodlets could have partial rectangular cross-sections, as indicated by reference numeral 139. The term "partial rectangular" is used here to indicate that the rodlets have two right angles and either four or five sides, wherein one or two sides may be curved.

The rodlets shown in FIGS. 9-11 may be simpler to make than the rodlets shown in FIGS. 6-8. However, the rodlets of FIGS. 9-11 will have a lower percentage of theoretical density than those of FIGS. 6-8. In addition, the rodlets of FIG. 10 and FIG. 11 have sharp edges contacting the hafnium skin. This may create stress points on the hafnium skin that may make the skin easier to rupture, which would be undesirable.

There may be small voids or spaces in the central cavity, for example between adjacent rodlets, as well as between the rodlets and the hafnium skin itself. Hafnium powder may be used to pack these voids (e.g. voids 103 in FIG. 9 or FIG. 11). The hafnium powder may be elemental hafnium, or hafnium oxide. The powder also decreases the friction between rodlets and enhances overall rod flexibility. Using elemental hafnium powder increases the maximum hafnium loading of the overall control rod. However, elemental hafnium powder may be more prone to hydriding if hydrogen-bearing materials enter the hafnium skin. Using $HfO_2$ powder can serve as an additional inhibitor of hydriding if hydrogen-bearing materials enter the hafnium skin, protecting the function of the rodlets. However, using $HfO_2$ decreases the hafnium loading of the overall control rod compared to the use of elemental hafnium powder. In a subsequent sealing step, any remaining voids are preferably filled with a suitable neutral gas, such as argon or nitrogen, at a suitable pressure level before the rod is sealed.

It is specifically contemplated that the embodiments shown in FIGS. 4-11 use hafnium rodlets or Ag—In—Cd rodlets. In other embodiments, the hafnium skin can be filled with hafnium pills. The term "pills" refers to pieces of elemental hafnium which are larger than hafnium powder, with minimum dimensions of about 0.1 mm. However, pills do not have an axial length that extends from the top end 112 of the hafnium skin to the bottom end 104 of the hafnium skin. Whereas the rodlets have a length/diameter ratio of about 210, pills have a length/diameter ratio of from about 1 to about 40. The hafnium skin may also be filled with powder, along with the pills. The use of hafnium pills and powder may allow the overall control rod to have less resistance to insertion in a warped guide rube. However, if mechanical flexibility is desired, such embodiments that do not include rodlets may not have adequate spring resistance to return to a "straight" rod configuration. It is also possible that such embodiments are more vulnerable to puncture and/or denting of the hafnium skin.

Figure 12:
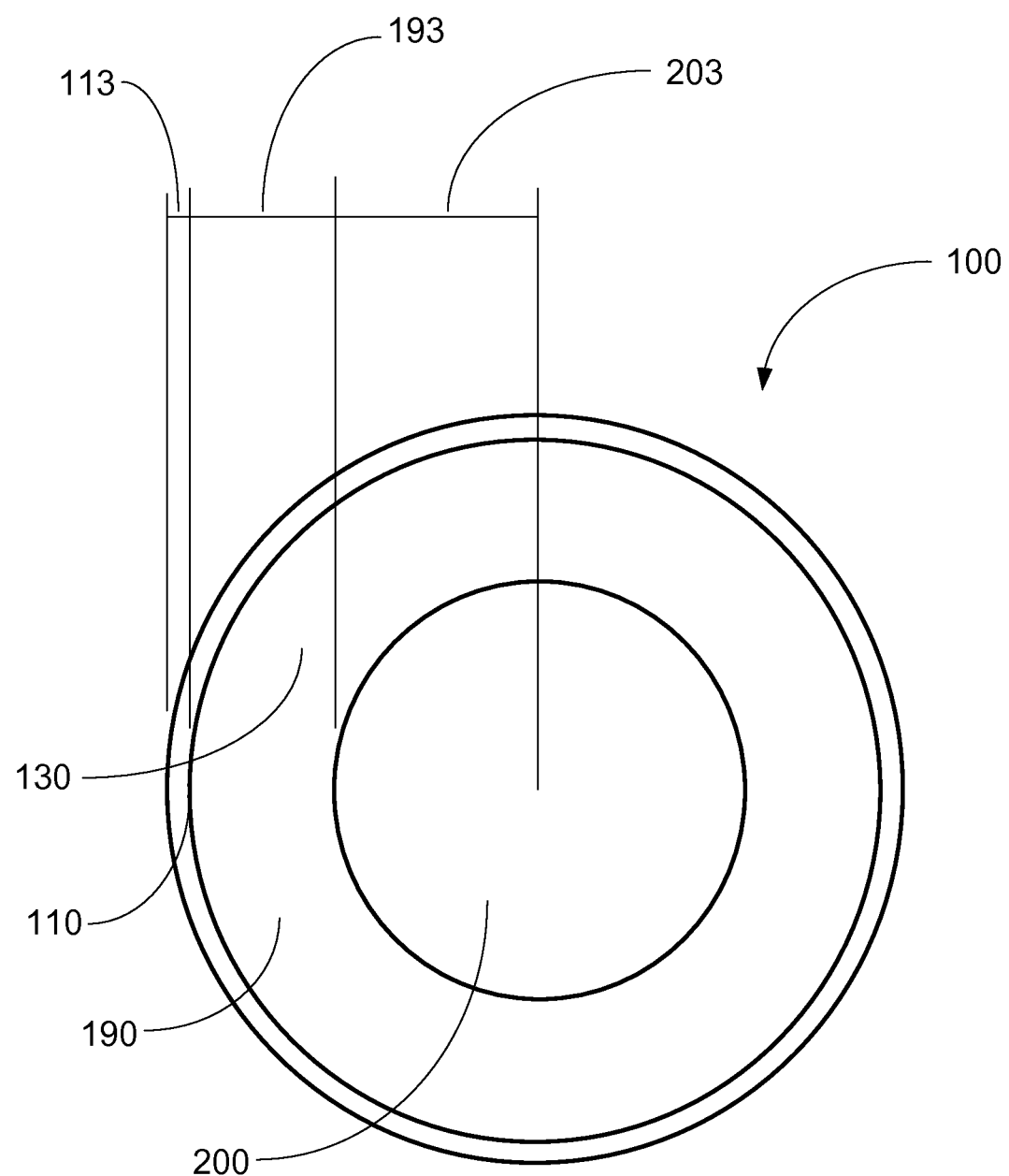
FIG. 12 is a top cross-sectional view of a eighth exemplary control rod formed from a hafnium skin and filled with powder in two concentric regions.

Another embodiment is shown in FIG. 12. Here, the control rod 100 is formed from a hafnium skin 110. The hafnium skin 110 surrounds a central cavity 130. The central cavity 130 is filled with hafnium powder from the bottom end 104 of the control rod to the top end 102 of the control rod. The hafnium powder may be elemental hafnium or hafnium diboride.

In the embodiment of FIG. 12, the hafnium powder is separated into a concentric outer region 190 and inner region 200. The outer region 190 is filled with elemental hafnium powder, while the inner region is filled with hafnium diboride ($HfB_2$) powder at 70% t.d. If desired, the $HfB_2$ powder can be enriched in B-10, for example up to 40 wt %. The radial thickness 203 of the inner region 200 may vary from greater than zero to about 3.9 millimeters. The radial thickness 193 of the outer region, along with the thickness 113 of the hafnium skin 110, makes up the remainder of the radius of the control rod.

Figure 13:
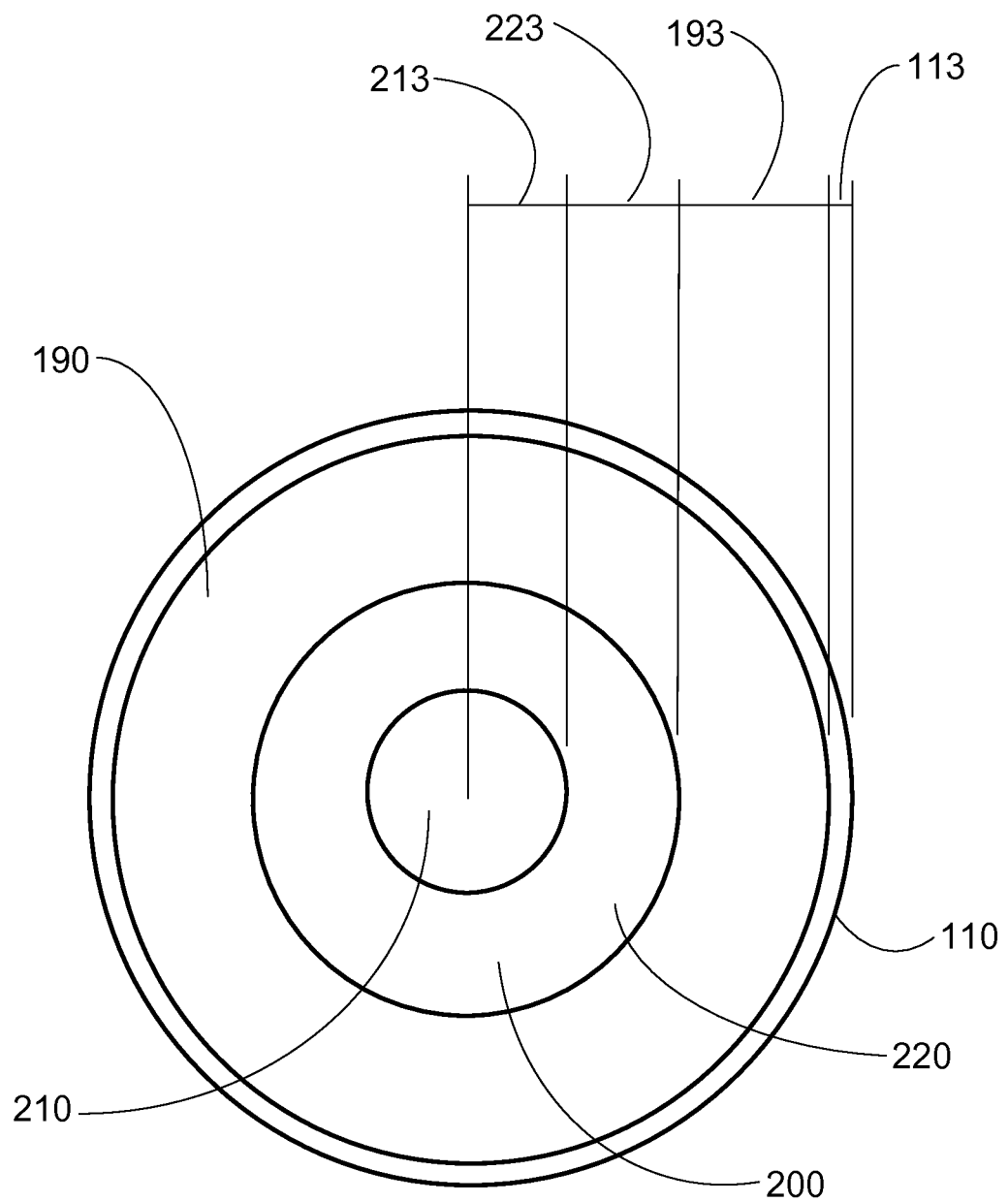
FIG. 13 is a top cross-sectional view of a ninth exemplary control rod formed from a hafnium skin and filled with powder in three concentric regions.

In additional embodiments as shown in FIG. 13, the inner region 200 is separated into a central region 210 and a secondary region 220. The central region 210 contains elemental hafnium powder, while the secondary region 220 contains $HfB_2$ powder. The radial thickness 213 of the central region 210 may vary from greater than zero to about 3.9 millimeters. The radial thickness 223 of the secondary region 220 may also vary from greater than zero to about 3.9 millimeters.

When the central cavity of the hafnium skin is filled with hafnium rodlets, pills, or powder, the control rod can achieve a greater rod worth than is available from control rods that incorporate Ag—In—Cd or B4C. Because the control rod is made from mostly hafnium and does not waste volume on stainless steel, the rod worth of the overall control rod can be comparable to that of a standard B4C rod at 80% theoretical density ("t.d.") without the swelling-with-irradiation issues associated with B4C rods. Due to hafnium's high density, the control rod also has a greater weight than other rod designs, even compared to a design incorporating tungsten rodlets (which also reduce rod worth). This provides a higher rate of insertion under gravity. The control rod also has greater chemical, shape, and physical stability. The combination of these three properties makes this a superior design.

The use of a hafnium skin 110 is expected to protect the hafnium rodlets 140 from interaction with the environment in the fuel core. As previously noted, hafnium metal should not hydride at the temperatures to which the hafnium skin will be exposed. The presence of a hafnium oxide outer layer 120, when present, will also reduce hydriding of the rodlets because hydrogen cannot diffuse through hafnium oxide, as it can through stainless steel. Thus, hydriding is not expected to be a major concern. The hafnium oxide layer 120 can be created by applying a surface treatment to the hafnium skin, for example by controlled oxidation. Desirably, the hafnium oxide layer 120 has a thickness of from 5 micrometers to 10 micrometers. In addition, the hafnium metal has adequate strength and structural integrity to be attached to the spider assembly directly, without the need for a stainless steel cladding.

Figure 14:
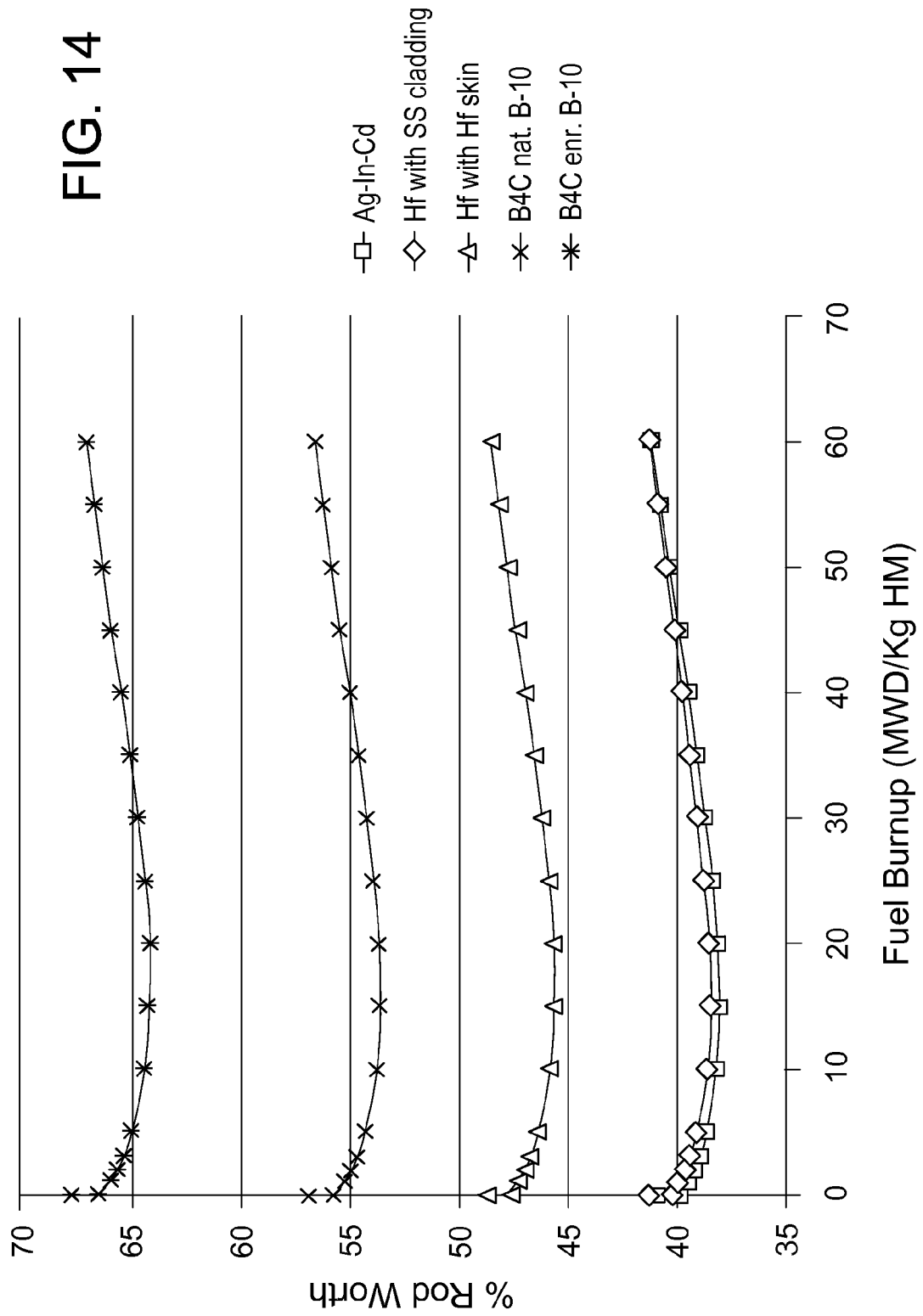
FIG. 14 is a graph of a computer simulation showing comparing the rod worth of control rods with different materials and structures.

FIG. 14 is a graph generated from computer calculations using CASMO5 to compare control rods using different materials and structure. The y-axis is the rod worth, and the x-axis is measured in fuel burnup (Megawatt·day per kg of heavy metal).

The calculations were performed with five different control rods:

(A) Ag—In—Cd (85-10-5 wt %, respectively);
(B) hafnium with steel cladding;
(C) hafnium with hafnium skin (no steel cladding);
(D) B4C rod with natural B-10 content at 80% t.d.; and
(E) B4C rod enriched to 40 wt % B-10 content at 80% t.d.

The rod worth was determined according to the formula RW=100%×[(K-inf un-rodded lattice/K-inf rodded lattice)−1]. The fuel lattice was $UO_2$ enriched to 4.95% U-235 and at 96% t.d. The $UO_2$ fuel was fresh, without burnable absorbers or soluble boron present. The fuel lattice consisted of 265 pins per assembly and 24 guide tubes. The graph shows that control rod (C) has a much higher rod worth than control rod (B) with the steel cladding.

Figure 15:
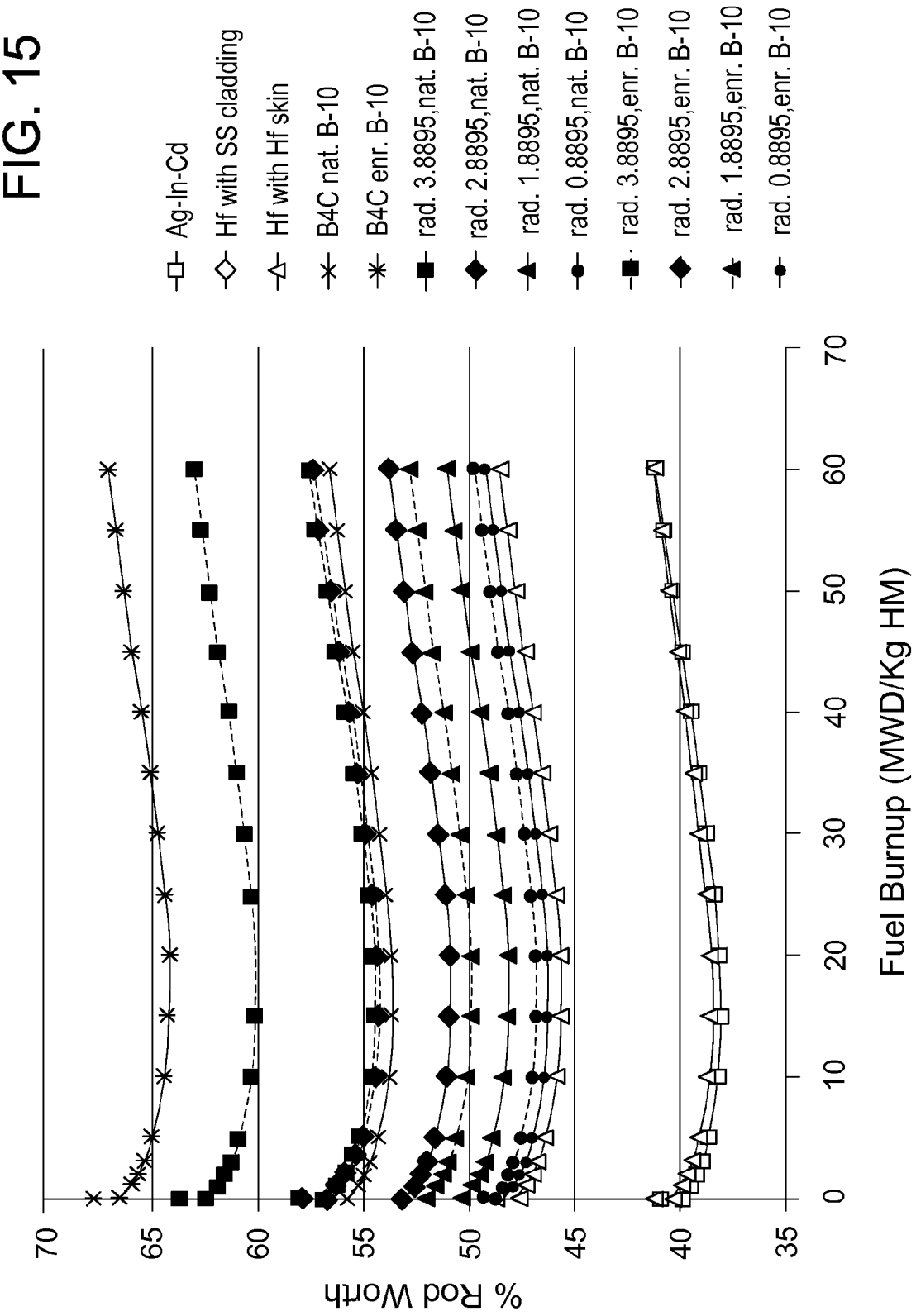
FIG. 15 is a graph of a computer simulation showing the effect of using varying amounts of different materials on the rod worth of control rods with two concentric regions.

FIG. 15 is a graph generated from computer calculations using CASMO5 to demonstrate the effect of changing the relative amounts of elemental hafnium and $HfB_2$ in the control rod on the rod worth of the control rod. Here, the control rod is separated into an inner region and an outer region as illustrated in FIG. 12. Using the reference numerals of FIG. 12, the inner region 200 is filled with elemental hafnium, and the outer region 190 is filled with $HfB_2$. Four different radii for the inner region (numeral 203) are used: 0.8895, 1.8895, 2.8895, and 3.8895 mm. The control rod has a total radius of 4.8895 mm, so the radial thickness (numeral 193) of the outer region is the difference between the total radius and the inner region radius. The $HfB_2$ was also modeled with natural B-10 content and enriched to 40 wt % B-10, both at 70% t.d.

The new control rods are:
(F) inner radius 3.8895, natural B-10 content for the $HfB_2$;
(G) inner radius 2.8895, natural B-10 content;
(H) inner radius 1.8895, natural B-10 content;
(J) inner radius 0.8895, natural B-10 content;
(K) inner radius 3.8895, 40 wt % B-10 content for the $HfB_2$;
(L) inner radius 2.8895, 40 wt % B-10 content;
(M) inner radius 1.8895, 40 wt % B-10 content; and
(N) inner radius 0.8895, 40 wt % B-10 content.

The control rods (A)-(E) of FIG. 14 are also shown here for comparison.

The graph of FIG. 15 shows two trends. First, as the amount of elemental hafnium decreased (i.e. decreasing inner radius), the rod worth also decreased. Second, enriched B-10 content of the $HfB_2$ increased the rod worth when the radius was maintained.

Figure 16:
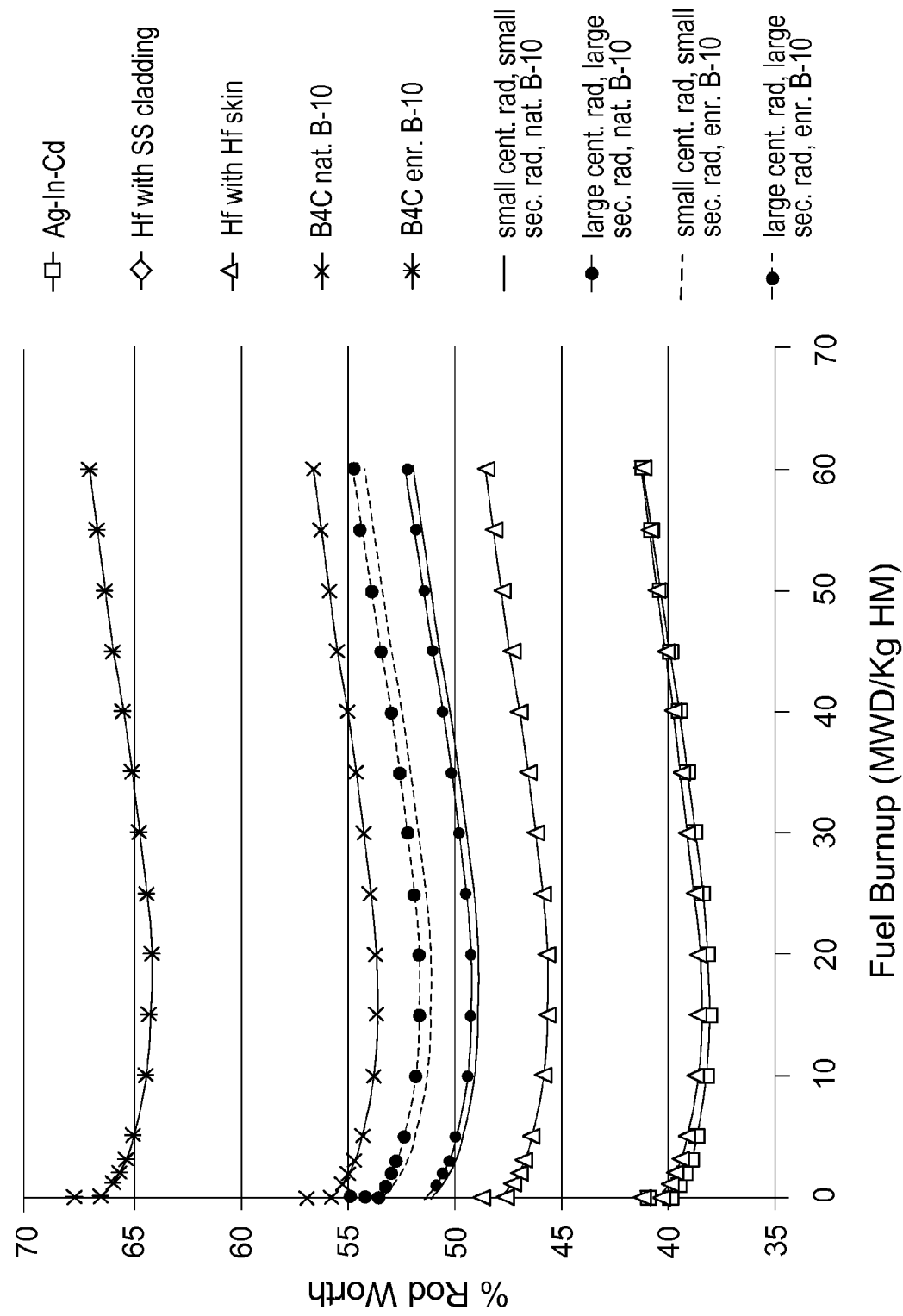
FIG. 16 is a graph of a computer simulation showing the effect of using varying amounts of different materials on the rod worth of control rods with three concentric regions.

FIG. 16 is a graph generated from computer calculations using CASMO5 to demonstrate the effect of changing the relative amounts of elemental hafnium and $HfB_2$ with three concentric regions in the control rod on the rod worth of the control rod. Here, the control rod is separated into a central region, a secondary region, and an outer region as illustrated in FIG. 13. Using the reference numerals of FIG. 13, the central region 210 is filled with elemental hafnium, the secondary region 220 is filled with $HfB_2$, and the outer region 190 is filled with elemental hafnium. The radius 213 of the central region is 2.8895 or 3.4524 mm. The radius 223 of the secondary region is 3.45245 or 3.93568 mm. The control rod has a total radius of 4.8895 mm, so the radial thickness (numeral 193) of the outer region is the difference between the total radius and the secondary region radius 223. The $HfB_2$ was also modeled with natural B-10 content and enriched to 40 wt % B-10, both at 70% t.d.

The new control rods are:
(P) central radius 2.8895, secondary radius 3.45245 with natural B-10 content;
(Q) central radius 3.4524, secondary radius 3.93568 with natural B-10 content;
(R) central radius 2.8895, secondary radius 3.45245 with 40 wt % B-10 content; and
(S) central radius 3.4524, secondary radius 3.93568 with 40 wt % B-10 content.

The control rods (A)-(E) of FIG. 14 are also shown here for comparison.

In these calculations, the relative amounts of elemental hafnium and $HfB_2$ in the control rod were held constant, and only their distribution was changed. The graph of FIG. 16 shows that loading the $HfB_2$ at larger radii increases the rod worth because of greater surface area.

Figure 17:
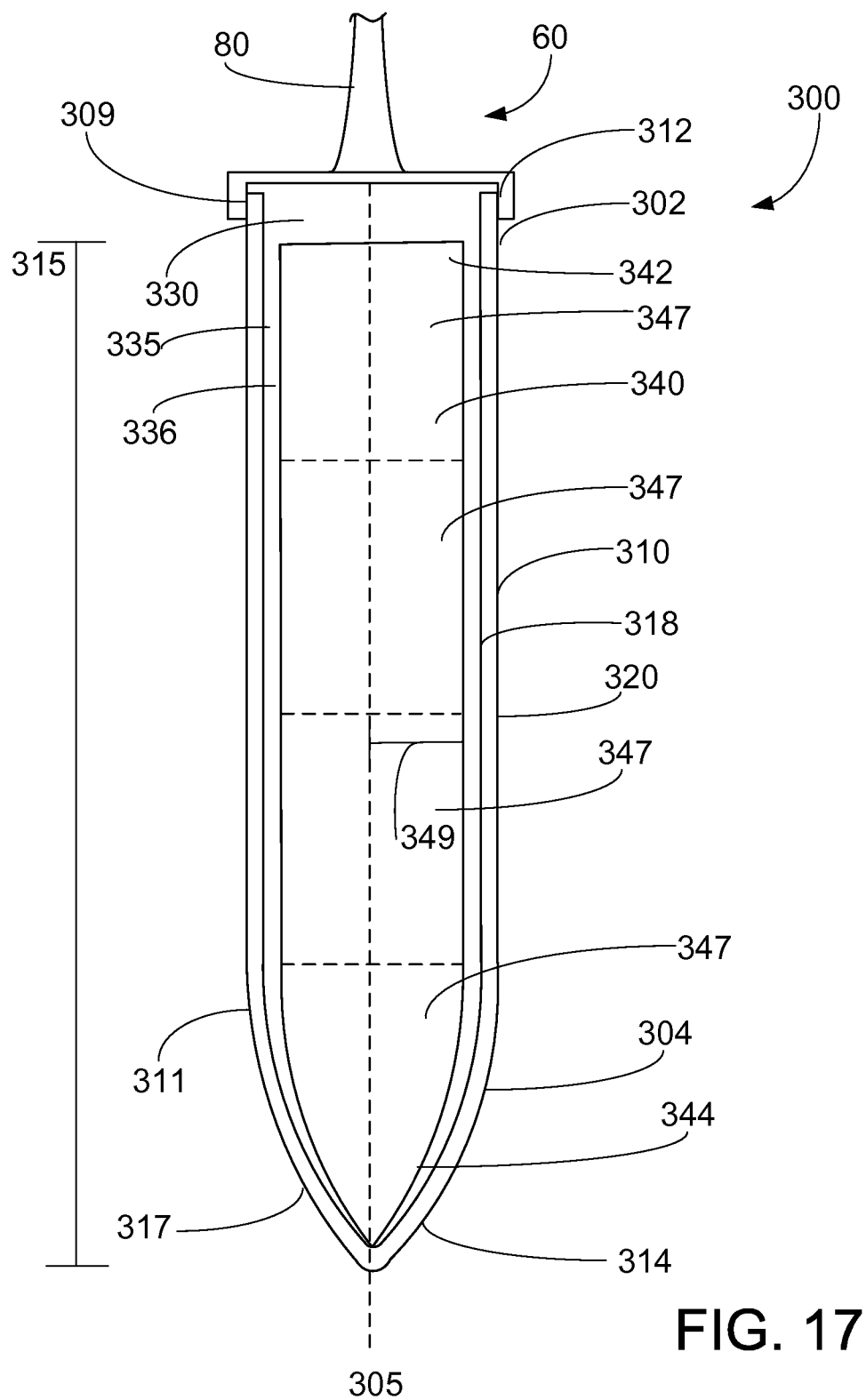
FIG. 17 is a side cross-sectional view of a tenth exemplary control rod.
Figure 18:
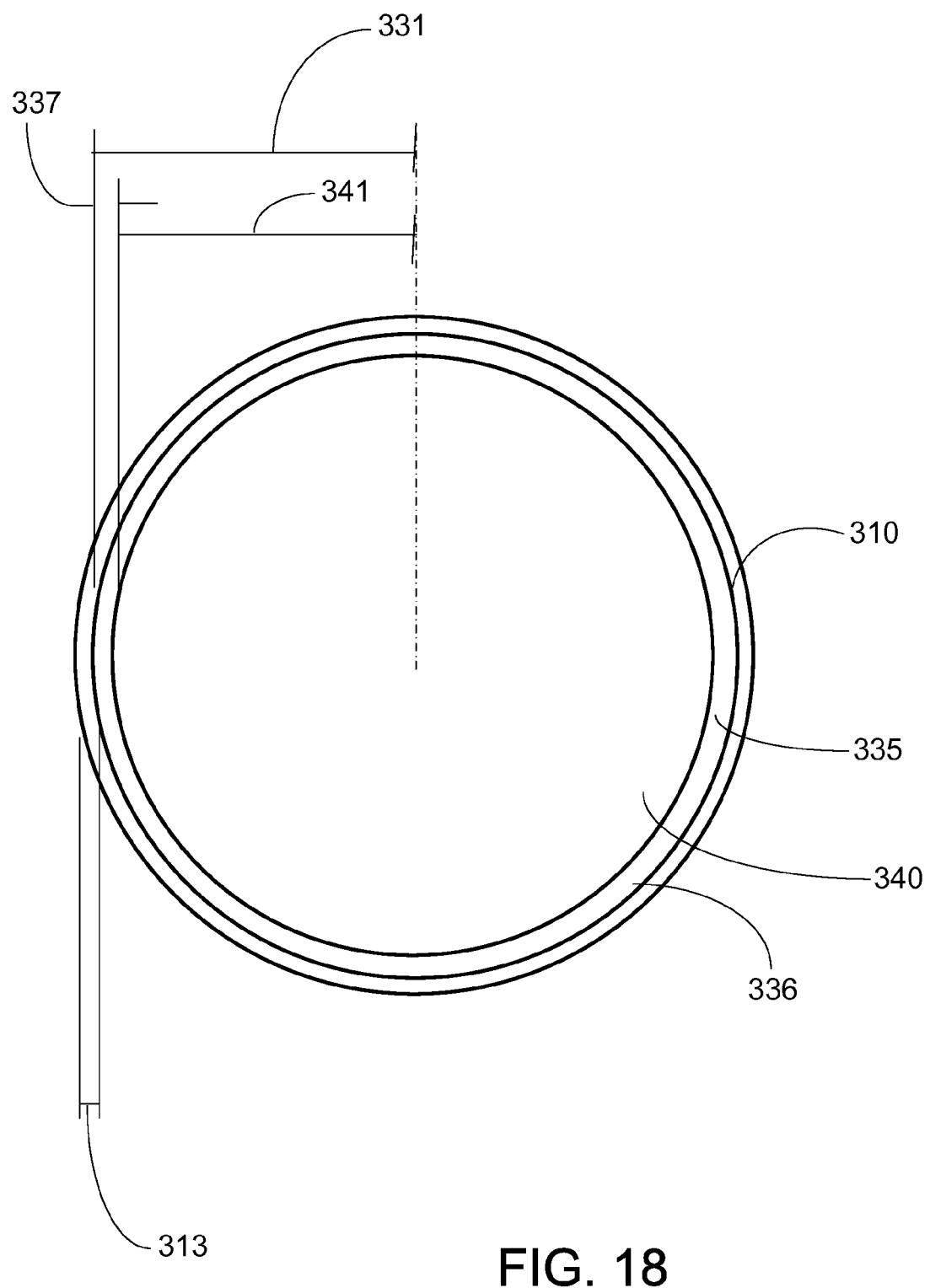
FIG. 18 is a top cross-sectional view of the exemplary control rod of FIG. 17.

Another exemplary embodiment of a control rod of the present disclosure is shown in FIG. 17 and FIG. 18. FIG. 17 is a side cross-sectional view of the control rod, and FIG. 18 is a top cross-sectional view.

The control rod 300 has a top end 302 and a bottom end 304. The control rod comprises a bare hafnium skin 310. The hafnium skin 310 has a top end 312 and a bottom end 314. The bottom end of the hafnium skin has a tapered or bullet-nose bottom tip 317. The hafnium skin 310 surrounds a central cavity 330. The central cavity has a radius 331 down to transition point 311 (at which point the skin tapers to form the bottom tip). The inner surface of the hafnium skin is labeled with reference numeral 318. The radial thickness 313 of the hafnium skin is generally constant along the length of the control rod. A thin hafnium oxide outer layer 320 may be present on the hafnium skin, and is the outermost surface of the control rod.

At least one Ag—In—Cd rodlet 340 is arranged axially within the central cavity, i.e. parallel to central axis 305. Put another way, the bare hafnium skin surrounds the Ag—In—Cd rodlet(s). The rodlet 340 has a top end 342 and a bottom end 344. The rodlet extends from the top end 102 of the control rod to the bottom end 104 of the control rod. The rodlet 140 is tapered at its bottom end 144 to conform to the bottom tip of the hafnium skin 110.

In particular embodiments, the control rod comprises a single rodlet 340 having a radial thickness 341 substantially equal to the radius 331 of the central cavity. In some embodiments, the single rodlet 340 is formed from a plurality of segments 347 (denoted in FIG. 17 with dotted lines), wherein each segment has a radial thickness 349 equal to the radius 131 of the central cavity and a length which is less than the length 315 of the control rod. Here, the rodlet 340 may have a radial thickness 341 of from about 3.6 millimeters to about 4.9 millimeters.

A radial gap 335 may be present between the Ag—In—Cd rodlet 340 and the hafnium skin 310. In embodiments, the radial gap may be a length 337 of from 0 to about 0.1 millimeters. The radial gap 335 may be filled with an inert gas (indicated with reference numeral 336), and pressurized at a suitable level before it is sealed. Exemplary inert gases include nitrogen and argon. The presence of the radial gap allows the rodlet 340 to expand radially before expanding axially in response to increasing temperature.

The top end 312 of the hafnium skin 110 may include a threaded screw connector 317 to facilitate its connection to an arm 80 of the spider assembly 60. The hafnium skin supports the weight of the rodlet 340. The threaded screw connection between the hafnium skin 310 and the arm 80 forms a seal to maintain the inert gas 336 within the hafnium skin.

Figure 19:
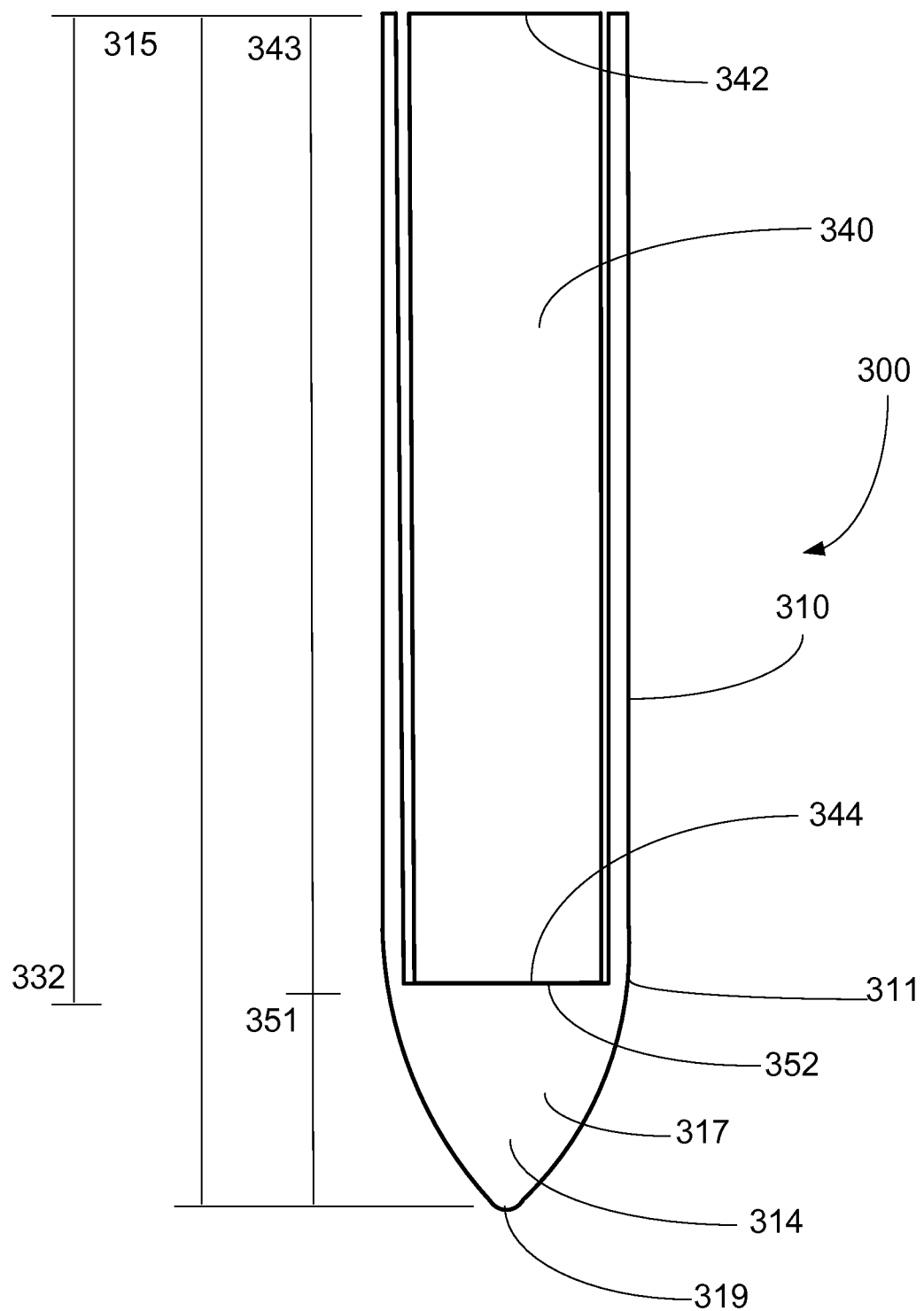
FIG. 19 is a side cross-sectional view of an eleventh exemplary control rod, wherein the bullet-nose bottom tip of the hafnium skin is solid hafnium.

FIG. 19 is a side cross-sectional view of another exemplary embodiment of a control rod 300. Here, the bottom end 314 of the hafnium skin is solid hafnium. Put another way, the hafnium skin has a solid tip and the central cavity 330 has a length 332 which is shorter than the length 315 of the control rod. The top surface 352 of the solid tip is flat. The bottom end 344 of the rodlet 340 has a flat surface that rests on the top surface 352. The rodlet is shown here with a length 343. In specific embodiments, the solid tip may extend for an axial length 351 of from about 10 centimeters to about 20 centimeters. This axial length is measured from the nadir 319 of the bottom end of the hafnium skin. In other embodiments, the ratio of the axial length 332 of the central cavity to the length 351 of the solid tip is from about 10.5 to about 21. Please note that the length 351 does not necessarily correspond to the transition point 311 at which the bottom end begins to taper; it is contemplated that the solid hafnium could extend above the transition point. Again, the rodlet of this embodiment is Ag—In—Cd.

Hafnium metal is very stiff. When coupled with possible bowing in the guide tubes of the fuel assemblies after irradiation, greater force may be required to insert the control rod during the allowable time of a rod scram. Thus, it is contemplated that in some embodiments, particularly those in which there is only one rodlet inside the central cavity of the hafnium skin, that a plurality of channels can be made on the outer surface of the rodlet along the axial length of the rodlet. The channels allow the rodlet to flex.

Figure 20:
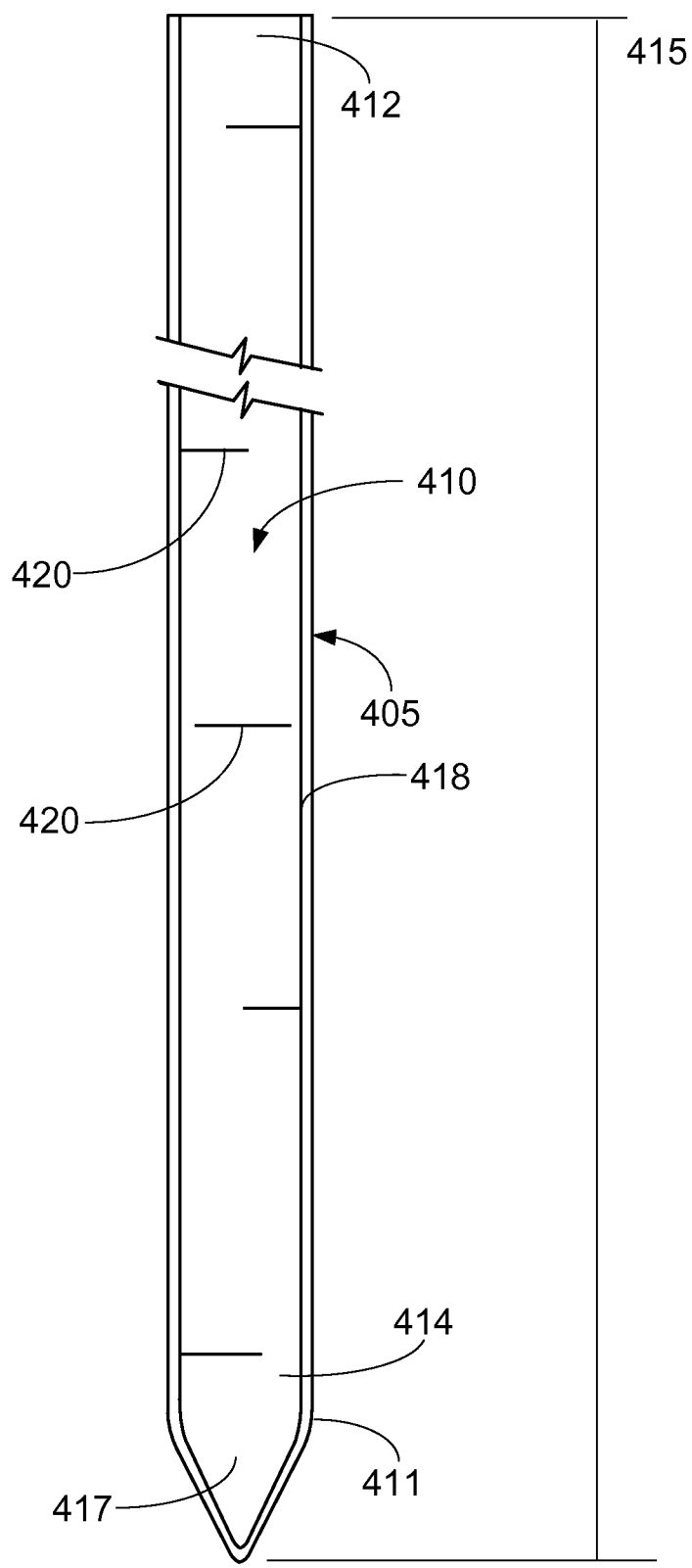
FIG. 20 is a side cross-sectional view of an exemplary control rod having a single rodlet within a hafnium skin, and channels on the outer surface of the rodlet.
Figure 21:
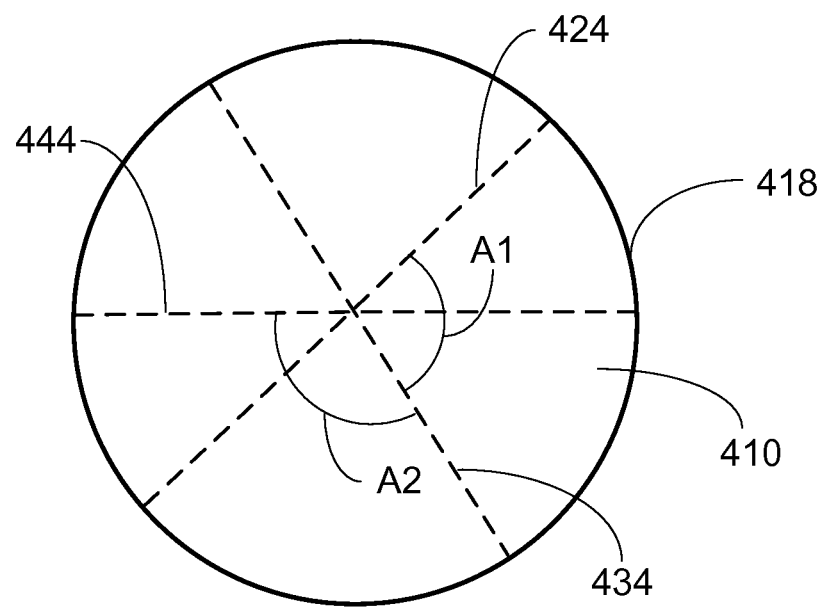
FIG. 21 is a top cross-sectional view of the rodlet of FIG. 20 illustrating the channels.
Figure 22:
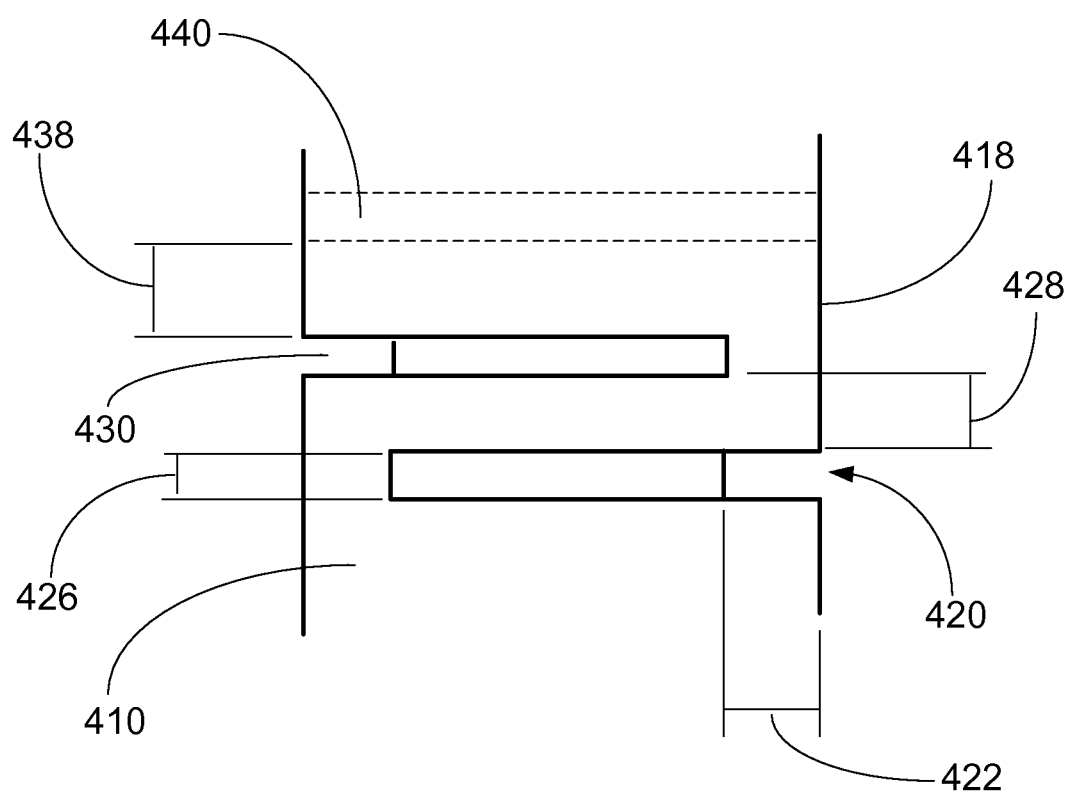
FIG. 22 is an enlarged side view of the rodlet of FIG. 20, showing details of the channels made in the rodlet.

FIGS. 20-22 provide an illustration of one such embodiment having channels in the rodlet. FIG. 20 is a side cross-sectional view, FIG. 21 is a top cross-sectional view, and FIG. 22 is an enlarged side view.

In this embodiment, a single solid hafnium rodlet 410 fills the central cavity of the hafnium skin 405. The rodlet 410 has a top end 412 and a bottom end 414. A bullet-nose bottom tip 417 is located at the bottom end of the rodlet. The rodlet has an axial length 415 extending between the top end 412 and the bottom end 414. The rodlet also has an outer or outermost surface 418. This single solid rodlet 410 generally spans the required active core height. A plurality of channels 420 is present along the axial length 415 of the rodlet. The channels begin above the bullet-nose bottom tip 417 of the rodlet. In embodiments, the channels begin about 10 centimeters above the transition point 411 where the bottom end 414 begins to taper to form the bottom tip 417 of the rodlet.

Referring now to FIG. 21 and FIG. 22, each channel 420 extends from the outer surface 418 into the rodlet for a depth 422 of from one-third to one-half of the diameter of the rodlet. The channel may have a width 426 corresponding to the width of the blade used to make the channel. In embodiments, the width 426 may be from about 0.5 millimeter to about 2 millimeters, particularly about 1 mm. The channel 420 forms a chord 424 of the rodlet.

Adjacent channels are separated axially by a gap 428. The separation between channels can vary as desired to provide the desired flexibility along the length/height of the rodlet. The size of the gap generally increases as the channels rise toward the top end 412 of the rodlet. In embodiments, each gap is at least 8 centimeters.

In addition, adjacent channels are rotated with respect to each other. In embodiments, adjacent channels can be rotated from 30° to 150°, as measured by the smallest angle formed between the chords of the two channels when viewed in cross-section.

These aspects are more clearly seen in FIG. 21 and FIG. 22. Here, three channels 420, 430, 440 are shown. The channel 420 is closest to the bottom end of the rodlet, and extends for a depth 422 depicted here as being one-half the diameter of the rodlet. The channel has a width 426. Channels 420 and 430 are separated by gap 428, while channels 430 and 440 are separated by gap 438. Gaps 428 and 438 may differ from each other, with gaps closer to the top end of the rodlet being larger than gaps closer to the bottom end of the rodlet. Looking at FIG. 21, channel 420 forms chord 424, channel 430 forms chord 434, and channel 440 forms chord 444. The portion of the rodlet removed at channel 420 is on the side seen in FIG. 22. Adjacent channels 420, 430 are rotated relative to each other by an angle A1 of 120°, which is measured here at their intersection. Adjacent channels 430, 440 are also rotated relative to each other by an angle A2 of 120°. The portion removed at channel 440 is on the side opposite that shown in FIG. 22, and is denoted in dotted line to indicate this fact. Please note here that the depth 422 is perpendicular to the width 426; and that the width 426 of the channel is in the same direction as the length 415 and height of the rodlet, i.e. the axial direction.

The channels may be made using a saw. The presence of the channels introduces bending flexibility in all directions about the rod axis at a very small cost in the rod worth. In a rod of length 2 meters, with 20 channels each of 1 mm width and a one-half diameter depth, the total material removed is less than 0.5% of the mass of the single rodlet, or roughly less than a 0.5% decrease in the reactivity control worth of the overall control rod.

Figure 23:
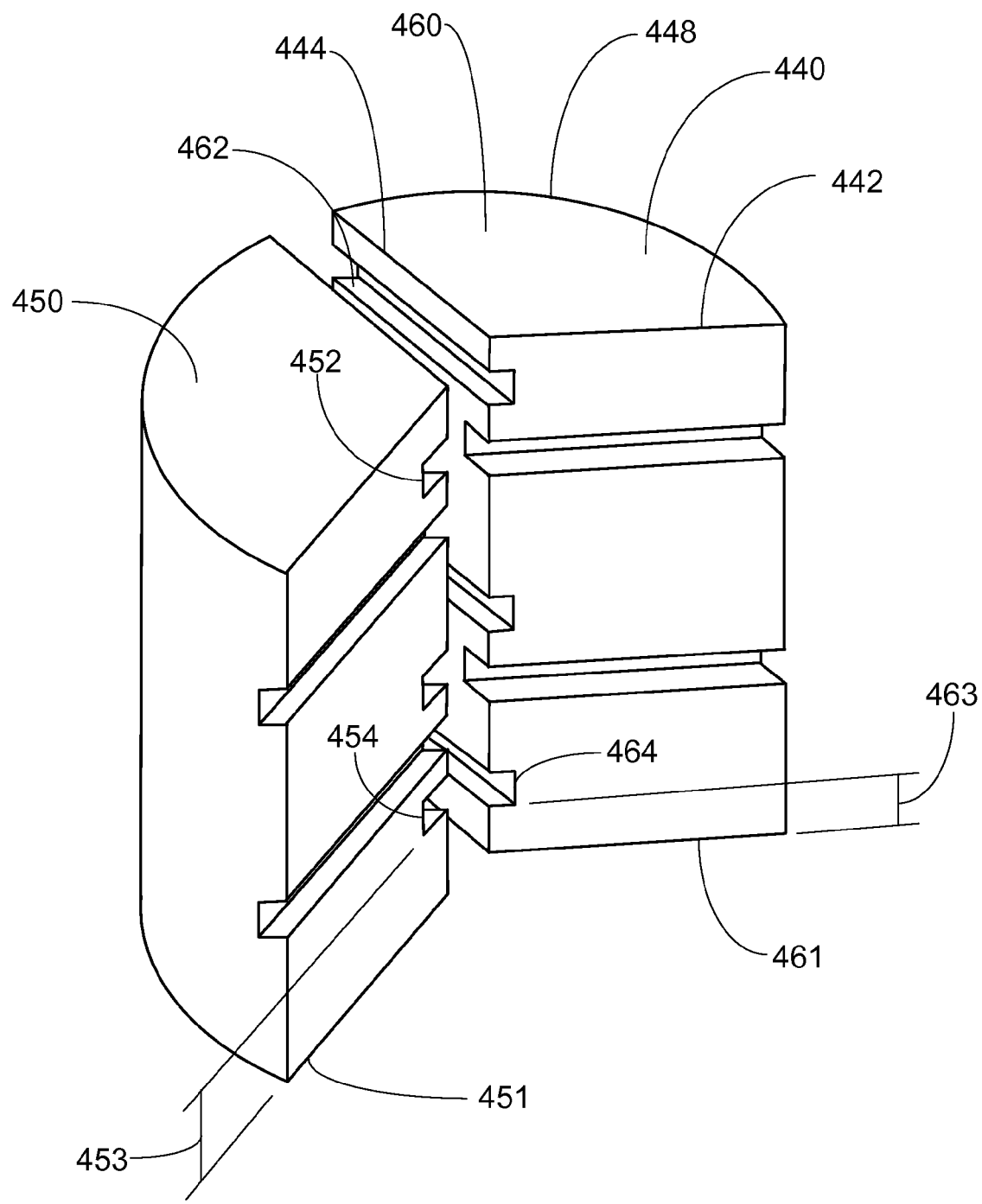
FIG. 23 is a perspective view showing two central rodlets having channels on their internal surface.

FIG. 23 also shows channels in another embodiment, which is useful when the hafnium skin is filled with a plurality of central rodlets. Each rodlet 440 could be described as having the shape of an angular wedge. Each rodlet 440 has two radial surfaces or internal surfaces 442, 444 and an outer surface 448 which faces the hafnium skin. The radial surfaces have a length 443 about equal to the radius of the central cavity. Here, the channels 420 are located on the radial surfaces 442, 444 instead of the outer surface as in the embodiment of FIG. 21. This construction permits the control rod to flex as well, and also offers the advantage that the channels 420 will not snag on the hafnium skin during such flexing.

In particular embodiments, the channels on the rodlets are arranged so that channels on one rodlet do not directly face the channels on any adjacent rodlets. Positive and negative examples are illustrated in FIG. 23. Here, rodlet 450 has channels 452, 454. Rodlet 460 has channels 462, 464. Channel 462 does not directly face channel 452. However, channel 464 does directly face channel 454. Put another way, if the bottom end 451 of rodlet 450 and the bottom end 461 of rodlet 460 are in the same plane, then channels directly face each other when the height 453 is equal to height 463. In specific embodiments, each channel extends from the radial surface into the rodlet for a depth of from one-tenth to two-thirds of the length 443 of the radial surface.

Figure 24:
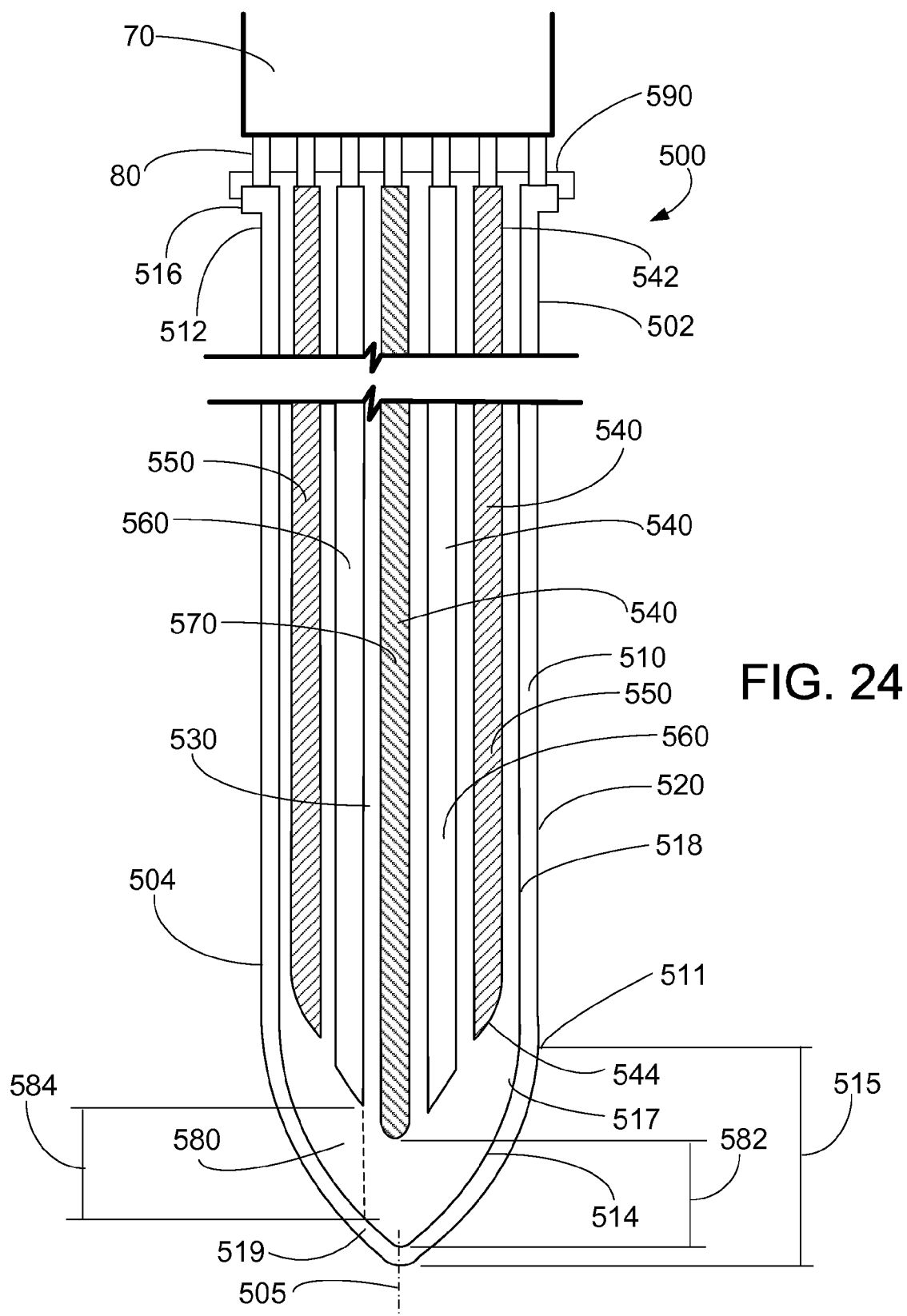
FIG. 24 is a side cross-sectional view of another exemplary control rod which contains rodlets and a pocket in the bottom tip of the hafnium skin. The control rod is filled with an inert gas.
Figure 25:
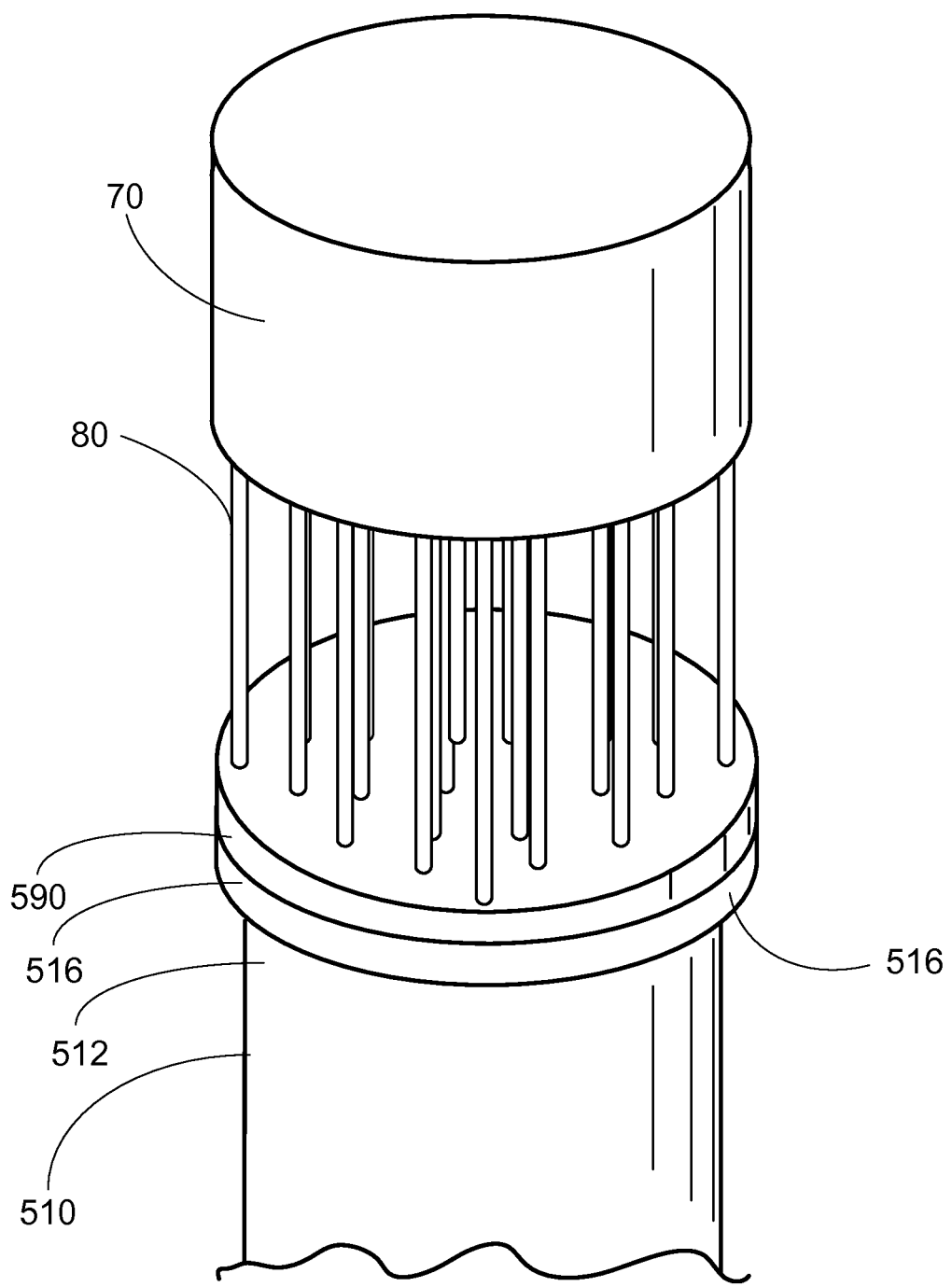
FIG. 25 is a perspective view of the top end of the control rod of FIG. 24. A gas-tight seal is present at the top end to keep inert gas within the hafnium skin.

FIG. 24 and FIG. 25 illustrate one additional variation that can be used in the control rod of the present disclosure when the hafnium skin contains more than one rodlet. When the control rod is flexed, for example due to insertion in a warped guide tube, the individual rodlets will flex in different ways. This concept can be visualized, for example, as two adjacent metal strips of equal length that are attached together on one end. If the strips are bent into an arc, the inner strip will appear longer than the outer strip. Applied to a control rod, it is possible that some of the rodlets could bend less than the hafnium skin such that the rodlets perforate the hafnium skin through the bullet-nose tip or on the sides of the hafnium skin. This problem is resolved by shortening the rodlets relative to the bullet-nose tip or the bottom end of the hafnium skin.

The control rod 500 has a top end 502 and a bottom end 504. The hafnium skin 510 has a top end 512, a bottom end 514, and a bottom tip 517 which tapers beginning at transition point 511. The axial distance (i.e. parallel to central axis 505) between the transition point 511 and the nadir 519 of the bottom tip 514 is indicated as reference numeral 515. This axial distance 515 is from about 5 centimeters to about 8 centimeters. The hafnium skin also surrounds a central cavity 530. A thin hafnium oxide outer layer 520 may be present on the hafnium skin. The inner surface of the hafnium skin is labeled with reference numeral 518.

A plurality of rodlets 540 are arranged axially within the central cavity 530. Each rodlet 540 has a top end 542 and a bottom end 544, the top end being interconnected to the spider assembly through arm 80. Again, each rodlet hangs under its own weight from the spider assembly. As seen in FIG. 24, the rodlets can include central rodlet(s) 570, distal rodlets 550, and intermediate rodlets 560.

Generally speaking, the bottom ends of the rodlets are spaced apart from the hafnium skin, such that a pocket or void 580 is present between the bottom ends of the rodlets and the tip 517 of the bottom tip of the hafnium skin. Put another way, the void 580 is located in the bottom tip 514 of the hafnium skin. No rodlets 540 are present in the pocket 580. The void 580 is reflected as the distance between the bottom ends 544 of the rodlets and the inner surface 518 of the hafnium skin in the axial direction, as reflected in axial lengths 582 and 584, measured from rodlets 570 and 560, respectively. In embodiments, the void has a minimum axial length, measured relative to each rodlet in the central cavity, of from 1 centimeter to about 5 centimeters, or from 1 centimeter to 2 centimeters.

The top end 512 of the hafnium skin may have a lip 516 to facilitate interconnection with the spider assembly. In addition, a seal 590 is present at the top end 502 of the control rod. It is contemplated that the central cavity 530 (including the void 580) will be filled with an inert gas, such as helium or argon or some other suitable gas. The seal 590, as well as the hafnium skin, is impermeable to the inert gas. Any suitable construction that accomplishes this purpose may be used. For example, as seen in FIG. 25, the arms 80 could extend through ports in the seal to interconnect to the rodlets 540 and the hafnium skin 510. This use of slightly shorter rodlets allows the overall control rod 500 to flex while keeping the bottom ends of the rodlets away from the hafnium skin, preventing perforation. This construction is suitable for rodlets made of either hafnium metal or of Ag—In—Cd.

The control rod of the present disclosure achieves a number of advantages over other control rods. First, the control rod can achieve a greater rod worth than is available from control rods that use a stainless steel cladding. Because hafnium is used instead of stainless steel, the rod worth of the overall control rod can be comparable to that of a standard B4C rod at 80% theoretical density ("t.d.") without the swelling-with-irradiation issues associated with B4C rods. The control rod of the present disclosure also has a rod worth about 50% greater than an Ag—In—Cd rod with stainless steel cladding. Due to hafnium's high density, the control rod also has a greater weight than other rod designs, even compared to a design incorporating tungsten rodlets (which also reduce rod worth). The control rod of the present disclosure is about 30% heavier than an Ag—In—Cd rod with stainless steel cladding. This provides a higher rate of insertion under gravity. The control rod also has greater chemical, shape, and physical stability. The overall control rod is also flexible enough for use in a once-through fueling cycle. The relatively low cost of Ag—In—Cd is also a benefit.

Some computer calculations were performed on various control rod designs to determine the expected rod worth (RW) of the designs that included Ag—In—Cd rodlets within a hafnium skin. The rod worth was determined according to the formula RW=100%×[(K-inf un-rodded lattice/K-inf rodded lattice)−1]. The fuel lattice was $UO_2$ enriched to 4.95% U-235 and at 96% t.d. The $UO_2$ fuel was fresh, without burnable absorbers or soluble boron present. The fuel lattice consisted of 265 pins per assembly and 24 guide tubes.

The calculations were performed for five control rods. The control rod was modeled as illustrated in FIG. 18 and had a total radius of 0.48895 cm. The single rodlet had a radial thickness 341 of 0.4318 cm. The radial gap continued to a radius of 0.43815 cm (i.e. a radial thickness 337 of 0.00635 cm). The skin then continued to a radius of 0.48895 (i.e. a radial thickness 313 of 0.0508 cm).

Table 1 shows the resulting rod worth for rods with different materials in the rodlet, radial gap, and skin. The term "GAP" indicated that no material was present. The term "SS" refers to stainless steel.

TABLE 1

| Outer Radius (cm) | Control Rod 1 | Control Rod 2 | Control Rod 3 | Control Rod 4 | Control Rod 5 |
|---|---|---|---|---|---|
| 0.4318 | Ag—In—Cd | Ag—In—Cd | Ag—In—Cd | Ag—In—Cd | Hafnium |
| 0.43815 | Gap | Gap | Ag—In—Cd | Hafnium | Hafnium |
| 0.48895 | CRS | Hafnium | Hafnium | Hafnium | Hafnium |
| RW (%) | 39.37 | 47.13 | 47.60 | 47.62 | 46.94 |

These results indicate that the rods comprising a Ag—In—Cd rod and a hafnium skin (Control Rods 2-4) achieved rod worths comparable and even better than a bare hafnium rod in the simulations. While the simulations suggest that filling the gap with Ag—In—Cd improves rod worth, this configuration would not allow the Ag—In—Cd rodlet(s) to expand radially at high temperatures. Instead, the Ag—In—Cd rodlet(s) would expand axially, which would lower the rod worth per linear height of the rod at high temperatures.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An apparatus comprising:
   a control rod comprising a bare hafnium skin having a tapered bottom end forming a hollow bullet-nose bottom tip, the hafnium skin surrounding a central cavity, and a set of rodlets including at least one central rodlet and at least one distal rodlet, wherein the set of rodlets vary in length with the at least one central rodlet being longer than the at least one distal rodlet, and the at least one distal rodlet being disposed radially outwardly from the at least one central rodlet.

2. An apparatus comprising:
   a control rod including:
   a bare hafnium skin except optionally having a hafnium oxide outer coating, the hafnium skin having a bullet-nose bottom tip, the hafnium skin surrounding a central cavity; and
   a set of rodlets arranged axially within the central cavity, each rodlet extending from a top end of the control rod to a bottom end of the control rod, the rodlets filling the central cavity of the hafnium skin,
   wherein the hafnium skin and the rodlets hang under their own weight from a support and the rodlets do not rest on the bullet-nose bottom tip of the hafnium skin and do not depend on the hafnium skin or adjacent rodlets for support.

3. The apparatus of claim 2, wherein the set of rodlets comprises:
   a plurality of distal rodlets adjacent the hafnium skin and forming a distal annular layer, each distal rodlet having an outer surface and an inner surface, the outer and inner surfaces each having a first arc;

and at least one central rodlet at a center of the control rod, each central rodlet having an outer surface, the outer surface having a second arc.

4. The apparatus of claim 3, wherein the set of rodlets further comprises:
a plurality of intermediate rodlets forming an intermediate annular layer between the distal annular layer and the at least one central rodlet, each intermediate rodlet having an outer surface and an inner surface, the outer and inner surfaces each having a third arc.

5. The apparatus of claim 1, wherein the hafnium skin has a hafnium oxide outer layer with a thickness of 5 micrometers to 10 micrometers forming an outermost surface of the control rod.

6. An apparatus comprising:
a control rod including:
a hollow hafnium tube including a longitudinal center axis;
a set of rodlets including at least a first rodlet and a second rodlet
disposed inside the hollow hafnium tube; and
a hafnium oxide outer coating disposed on the outer surface of the hollow hafnium tube;
wherein the hafnium oxide outer coating has a thickness of between 5 micrometers and 10 micrometers, and
wherein the first rodlet and the second rodlet of the set of rodlets vary in length, and the second rodlet is disposed radially outwardly of the first rodlet with respect to the longitudinal center axis.

7. The apparatus of claim 6 wherein the set of rodlets disposed inside the hollow hafnium tube comprises at least one of hafnium and hafnium oxide.

8. The apparatus of claim 6 wherein the set of rodlets disposed inside the hollow hafnium tube comprises an alloy of silver, indium, and cadmium (Ag—In—Cd).

9. The apparatus of claim 2, wherein the bullet-nose bottom tip of the hafnium skin is one of:
(1) a hollow bullet-nose bottom tip and
(2) a solid bullet-nose bottom tip.

10. The apparatus of claim 1, wherein a bottom end of each rodlet conforms to the hollow bullet-nose bottom tip so that the bottom ends of the set of rodlets extend into the hollow bullet-nose bottom tip of the bare hafnium skin.

* * * * *